(12) United States Patent
Tsai et al.

(10) Patent No.: US 11,360,350 B2
(45) Date of Patent: **\*Jun. 14, 2022**

(54) OPTICAL SHEET, BACKLIGHT UNIT, LIQUID CRYSTAL DISPLAY DEVICE, AND INFORMATION DEVICE

(71) Applicant: KEIWA Inc., Tokyo (JP)

(72) Inventors: Chengheng Tsai, Taipei (TW); Motohiko Okabe, Tokyo (JP); Takahiro Tsuji, Tokyo (JP); Masayuki Sukigara, Tokyo (JP)

(73) Assignee: KEIWA INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,541

(22) Filed: Sep. 20, 2021

(65) Prior Publication Data

US 2022/0004058 A1 Jan. 6, 2022

Related U.S. Application Data

(63) Continuation of application No. 16/927,753, filed as application No. PCT/JP2019/035235 on Sep. 6, 2019, now Pat. No. 11,150,512.

(30) Foreign Application Priority Data

Nov. 16, 2018 (JP) .............................. JP2018-215551

(51) Int. Cl.
*G02F 1/13357* (2006.01)
*G02F 1/1335* (2006.01)

(52) U.S. Cl.
CPC .. *G02F 1/133606* (2013.01); *G02F 1/133603* (2013.01); *G02F 1/133605* (2013.01); *G02F 1/133607* (2021.01); *G02F 1/133613* (2021.01)

(58) Field of Classification Search
CPC ......... G02F 1/133603; G02F 1/133605; G02F 1/133606; G02F 2001/133607–133613
See application file for complete search history.

(56) References Cited

U.S. PATENT DOCUMENTS 6,417,831 B2   7/2002   Kashima
7,802,895 B2   9/2010   Suzuki
(Continued)

FOREIGN PATENT DOCUMENTS

CN         1255212 C      5/2006
CN         102472843 A    5/2012
(Continued)

OTHER PUBLICATIONS

Extended European Search Report for European Application No. 19207958.0 dated Oct. 25, 2021 (5 pages).
(Continued)

*Primary Examiner* — Jason M Han
(74) *Attorney, Agent, or Firm* — Alston & Bird LLP

(57) ABSTRACT

When at least one scope of 0.5 mm square or more of a surface of an optical sheet having the unevenness is measured, height data of each of a plurality of pixels of an image obtained is determined, an approximated surface is calculated, from the height data of each pixel, for a minute region of 100 μm2 or less, and a calculation is repeatedly performed to obtain an inclination angle between: (i) a flat surface appearing after the unevenness is imaginarily removed and: (ii) the approximated surface, while two-dimensionally shifting the minute region at equal intervals along the flat surface by using at least one of the pixels as a unit to obtain a plurality of minute regions, a total area of some of the minute regions each having the inclination angle of 30° or more, accounts for 30% or more of a total area of all the minute regions.

15 Claims, 17 Drawing Sheets

(56) References Cited

U.S. PATENT DOCUMENTS

| | | | |
|---|---|---|---|
| 8,167,473 B2 * | 5/2012 | Ahn | G02B 5/045 362/97.3 |
| 2004/0233853 A1 | 11/2004 | Hur et al. | |
| 2009/0059120 A1 | 3/2009 | Hoshi et al. | |
| 2009/0268430 A1 | 10/2009 | Suzuki et al. | |
| 2010/0033957 A1 | 2/2010 | Lin | |
| 2010/0066946 A1 | 3/2010 | Song et al. | |
| 2012/0176772 A1 | 7/2012 | Maekawa et al. | |
| 2014/0036536 A1 | 2/2014 | Gettemy et al. | |
| 2014/0340911 A1 | 11/2014 | Woo et al. | |
| 2014/0357809 A1 | 12/2014 | Miyake et al. | |
| 2019/0196272 A1 | 6/2019 | Johnson | |

FOREIGN PATENT DOCUMENTS

| | | |
|---|---|---|
| CN | 102597819 A | 7/2012 |
| CN | 102893711 A | 1/2013 |
| JP | 2004-127643 A | 4/2004 |
| JP | 2008-091114 A | 4/2008 |
| JP | 2008-103200 A | 5/2008 |
| JP | 2010-113853 A | 5/2010 |
| JP | 2010-243982 A | 10/2010 |
| JP | 2011-129277 A | 6/2011 |
| JP | 2012-042783 A | 3/2012 |
| JP | 2012-163785 A | 8/2012 |
| JP | 2013-225058 A | 10/2013 |
| JP | 2016-194552 A | 11/2016 |
| JP | 6683872 B1 | 4/2020 |
| KR | 10-2009-0070828 A | 7/2009 |
| KR | 10-2012-0023184 A | 3/2012 |
| KR | 10-2016-0089706 A | 7/2016 |
| KR | 10-2017-0018327 A | 2/2017 |
| TW | 201124754 A1 | 7/2011 |
| WO | WO-2011/013671 A1 | 2/2011 |
| WO | WO-2017/104677 A1 | 6/2017 |

OTHER PUBLICATIONS

Notice of Reasons for Refusal for Japanese Patent Application No. 2019-152692, dated Oct. 23, 2019, (8 pages), Japan Patent Office, Tokyo, Japan.

Written Opinion and Amendment for Japanese Patent Application No. 2019-152692, dated Jan. 30, 2020, (12 pages), Japan Patent Office, Tokyo, Japan.

Decision to Grant for Japanese Patent Application No. 2019-152692, dated Mar. 17, 2020, (5 pages), Japan Patent Office, Tokyo, Japan.

Partial European Search Report for European Patent Application No. 19207958.0, dated May 13, 2020, (11 pages), European Patent Office, Munich, Germany.

International Searching Authority, International Search Report and Written Opinion for International Application No. PCT/JP2019/035235, dated Nov. 5, 2019, (8 pages), Japan Patent Office, Tokyo, Japan.

* cited by examiner

FIG.9
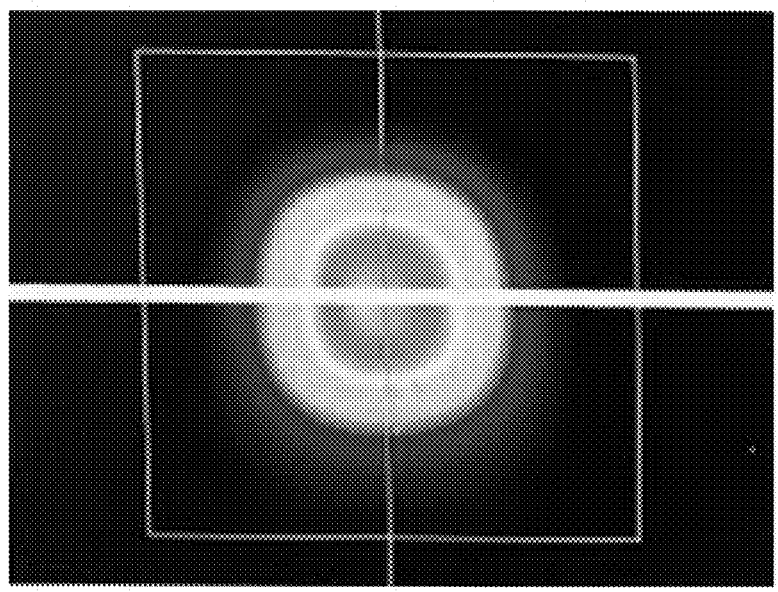
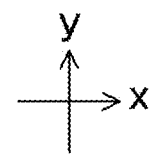
FIG.10
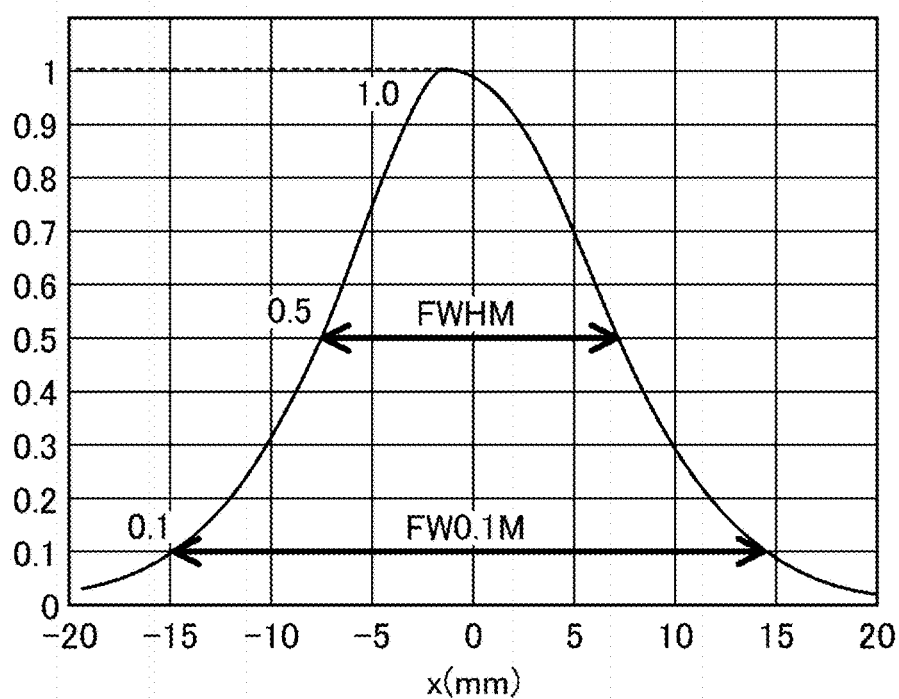

|  | LAYER STRUCTURE | Ra($\mu$m) | RATIO OF AREAS WITH INCLINATION ANGLES OF 30° OR MORE (%) | FWHM(mm) |
|---|---|---|---|---|
| COMPARATIVE EXAMPLE 1 | SINGLE LAYER | 3.632 | 25 | 10.97434 |
| EXAMPLE 1 | SINGLE LAYER | 11.427 | 36 | 11.13328 |
| COMPARATIVE EXAMPLE 2 | SINGLE LAYER | 0.443 | 17 | 10.4808 |
| EXAMPLE 2 | SINGLE LAYER | 0.528 | 30 | 11.145 |
| EXAMPLE 3 | SINGLE LAYER | 1.070 | 52 | 11.201 |
| EXAMPLE 4 | SINGLE LAYER | 2.435 | 90 | 11.6638 |
| EXAMPLE 5 | MULTILAYER (CLEAR SURFACE LAYER) | 0.553 | 32 | 11.6034 |

FIG.22

| | UNIT | EXAMPLE 6 | EXAMPLE 7 | EXAMPLE 8 | EXAMPLE 9 | EXAMPLE 10 | EXAMPLE 11 | EXAMPLE 12 | EXAMPLE 13 | EXAMPLE 14 | EXAMPLE 15 | EXAMPLE 16 | EXAMPLE 17 | EXAMPLE 18 | EXAMPLE 19 | EXAMPLE 20 |
|---|---|---|---|---|---|---|---|---|---|---|---|---|---|---|---|---|
| MATRIX RESIN | parts by weight | 100 | 100 | 100 | 100 | 100 | 100 | 100 | 100 | 100 | 100 | 100 | 100 | 100 | 100 | 100 |
| CONTENT OF DIFFUSING AGENT | parts by weight | 0.0 | 0.2 | 0.4 | 0.8 | 1.2 | 2.0 | 4.0 | 6.0 | 8.0 | 0.8 | 0.8 | 0.8 | 0.8 | 0.8 | 0.8 |
| FILM THICKNESS | μm | 160 | 160 | 160 | 160 | 160 | 160 | 160 | 160 | 160 | 100 | 130 | 210 | 250 | 210 | 250 |
| SURFACE SHAPE AND SURFACE ROUGHNESS | INVERTED PYRAMID SHAPE | — | PRESENT | PRESENT | PRESENT | PRESENT | PRESENT | PRESENT | PRESENT | PRESENT | PRESENT | PRESENT | PRESENT | PRESENT | PRESENT | PRESENT | PRESENT |
| | RATIO OF AREAS WITH INCLINATION ANGLES OF 30° OR MORE (%) | % | 82 | 81 | 81 | 83 | 82 | 82 | 83 | 82 | 82 | 83 | 83 | 81 | 81 | 81 | 81 |
| | SURFACE ROUGHNESS ON OPPOSITE SIDE (Ra) | μm | 3.5 | 3.3 | 3.7 | 3.5 | 3.6 | 3.4 | 3.5 | 3.3 | 3.4 | 3.4 | 3.5 | 3.6 | 3.5 | 0.02 | 0.02 |
| FWHM | nm | 6.09 | 5.94 | 5.85 | 5.65 | 5.32 | 4.81 | 3.93 | 3.65 | 3.57 | 5.39 | 5.58 | 5.91 | 5.95 | 4.53 | 4.62 |
| FW0.1M | nm | 14.54 | 14.15 | 13.76 | 13.36 | 12.66 | 11.4 | 9.27 | 8.60 | 8.44 | 12.38 | 12.63 | 14.25 | 14.35 | 11.19 | 11.63 |
| TRANSMITTANCE OF SPECTRAL BEAMS (400nm to 700 nm IN AVERAGE) | % | 33.7 | 39.1 | 45.8 | 52.6 | 55.8 | 60.3 | 64.7 | 68.1 | 69.4 | 50.7 | 50.1 | 60.3 | 64.3 | 59.1 | 63.7 |
| REFLECTANCE OF SPECTRAL BEAMS (400nm to 700 nm IN AVERAGE) | % | 53.0 | 52.8 | 49.5 | 45.7 | 44.0 | 39.5 | 35.2 | 32.1 | 30.5 | 45.9 | 46.8 | 39.5 | 35.8 | 40.3 | 36.6 |

FIG.25

| | UNIT | EXAMPLE 21 | EXAMPLE 22 | EXAMPLE 23 | EXAMPLE 24 | EXAMPLE 25 | EXAMPLE 26 | EXAMPLE 27 | EXAMPLE 28 | EXAMPLE 29 | EXAMPLE 30 | EXAMPLE 31 | EXAMPLE 32 |
|---|---|---|---|---|---|---|---|---|---|---|---|---|---|
| MATRIX RESIN | parts by weight | 100 | 100 | 100 | 100 | 100 | 100 | 100 | 100 | 100 | 100 | 100 | 100 |
| CONTENT OF DIFFUSING AGENT | parts by weight | 0 | 0.2 | 0.4 | 0.8 | 2.0 | 4.0 | 6.0 | 8.0 | 0.0 | 0.8 | 2.0 | 6.0 |
| FILM STRUCTURE (Front) INVERTED PYRAMID SURFACE (Back) MATTE SURFACE FILM (150 μm) | PIECE | 3 | 3 | 3 | 3 | 3 | 3 | 3 | 3 | 0 | 0 | 0 | 0 |
| FILM STRUCTURE (Front) INVERTED PYRAMID SURFACE (Back) MATTE SURFACE FILM (115 μm) | PIECE | 0 | 0 | 0 | 0 | 0 | 0 | 0 | 0 | 4 | 4 | 4 | 4 |
| LUMINANCE UNIFORMITY | % | 97.6 | 97.4 | 97.2 | 97.0 | 96.4 | 95.1 | 94.1 | 93.1 | 98.0 | 97.8 | 97.0 | 94.8 |
| AVERAGE TRANSMITTANCE OF SPECTRAL BEAMS OF 400 nm TO 700 nm | % | 15.1 | 20.0 | 24.0 | 29.1 | 33.4 | 35.6 | 36.9 | 38.1 | 10.1 | 22.3 | 27.3 | 31.5 |
| AVERAGE REFLECTANCE OF SPECTRAL BEAMS OF 400 nm TO 700 nm | % | 69.4 | 72.0 | 70.7 | 68.6 | 64.1 | 62.3 | 60.1 | 59.8 | 74.0 | 74.1 | 70.2 | 64.5 |
| AVERAGE VALUE OF "RATIO OF AREA WITH INCLINATION ANGLES OF 30° OR MORE" of OPTICAL SHEETS USED | % | 82 | 82 | 82 | 82 | 82 | 82 | 82 | 82 | 83 | 83 | 83 | 83 |

OPTICAL SHEET, BACKLIGHT UNIT, LIQUID CRYSTAL DISPLAY DEVICE, AND INFORMATION DEVICE

CROSS REFERENCE TO RELATED APPLICATIONS

This application is a continuation of U.S. patent application Ser. No. 16/927,753, filed on Jul. 13, 2020, which application was itself a continuation of International Application No. PCT/JP2019/035235, filed on Sep. 6, 2019, which international application further claims priority to and the benefit of Japanese Patent Application No. 2018-215551, filed on Nov. 16, 2018. The entire disclosures of these applications are hereby incorporated by reference herein.

BACKGROUND

Related Field

The present disclosure relates to an optical sheet, a backlight unit, a liquid crystal display device, and an information device.

Description of Related Art

In recent years, liquid crystal display devices (hereinafter, also referred to as "liquid crystal displays") are widely used as display devices in various information devices such as smartphones and tablet terminals. The mainstream backlights of liquid crystal displays include a direct type having a light source arranged on the back side of a liquid crystal panel and an edge-lit type having a light source arranged near a side of a liquid crystal panel.

In cases of adopting a direct-type backlight, a distance from a light source to a diffusion member (diffusion plate, diffusion sheet, diffusion film) used for erasing a light source image is typically set long, so as to erase the image of the light source such as Light Emitting Diodes (LEDs) or the like on the light emitting surface, thereby improving the uniformity of the in-plane luminance.

For this reason, while there are cases of adopting the direct backlight in a large liquid crystal display for use in, for example, a TV monitor and the like, the edge-lit backlight has been adopted in many cases in small to medium size liquid crystal displays of, for example, a laptop PC, a tablet device, a car navigation system, a smartphone, and the like, to meet the demand for a reduction in the thickness.

In recent years, for the purpose of improving the image quality on a liquid crystal display, development for supporting High Dynamic Range: widening the range of brightness (HDR) has been advanced. An approach currently discussed to support the HDR is to adjust the amount of backlight, in addition to a shutter function using liquid crystals, by causing LEDs of the direct backlight to individually turn on, turn off, and perform light-amount adjustment (local-dimming).

There is also a demand for small to medium size liquid crystal displays to support the HDR by the local-dimming method involving the direct backlight. However, the thicknesses of small and medium size liquid crystal displays have been already reduced by adopting the edge-lit method, and it is difficult to increase the thicknesses of such liquid crystal displays for the purpose of supporting the HDR. For this reason, there is a need for reducing the thickness of the direct backlight.

An approach to improve the luminance uniformity of the light emitting surface, while reducing the thickness of the direct backlight is to improve the light diffusibility of the diffusion sheet or the like used for erasing the image of the light source. An example of doing so is to provide a large quantity of diffusing agent to the diffusion sheet and the like. In this regard, Japanese Unexamined Patent Publication No. 2012-42783 proposes using an optical sheet having a plurality of lenses with recesses. Further, Japanese Unexamined Patent Publication No. 2008-103200 proposes an arrangement of LED light sources so that three adjacent LED light sources constitute vertices of an equilateral triangle.

BRIEF SUMMARY

However, even if a large amount of diffusing agent is provided in an optical sheet (diffusion sheet) to improve the luminance uniformity of the light emitting surface of the direct backlight using a plurality of light sources, non-uniformity of the luminance occurring between the light sources and areas between the light sources (areas where no light sources are arranged) cannot be sufficiently addressed (see paragraph [0009] of Japanese Unexamined Patent Publication No. 2012-42783).

As to the distance from the light source to an optical sheet or a diffusion plate for erasing the image of the light source, Japanese Unexamined Patent Publication No. 2012-42783 discloses 20 mm (paragraph 0048) and Japanese Unexamined Patent Publication No. 2008-103200 disclose 25 mm (paragraph 0024). The distance, however, needs to be 15 mm or less (preferably 10 mm or less, more preferably 5 mm or less, furthermore preferably 2 mm or less, and ultimately 0 mm), in order to achieve a reduction in the thickness of future small to medium size liquid crystal displays.

However, regarding a reduction in the thickness of future direct backlights, the technique of Japanese Unexamined Patent Publication No. 2012-42783 to "arrange a plurality of lenses each having recesses on an optical sheet" and the technique of Japanese Unexamined Patent Publication No. 2008-103200 to "arrange LED light sources so that three adjacent LED light sources constitute vertices of an equilateral triangle" may fall short for sufficiently improving the luminance uniformity of the light emitting surface.

In view of the above, it is an object of the present disclosure to sufficiently suppress non-uniformity of the luminance between light sources and areas between light sources on the light emitting surface, despite further progress in a reduction in the thickness of direct backlights for liquid crystal display devices.

To achieve the above object, the inventors have conducted a study on luminance uniformity on the light emitting surface of a direct backlight, using optical sheets of various surface shapes. As a result of the study, the inventors have found that luminance uniformity is largely influenced by the light reflection characteristics of optical sheets, in addition to the arrangement of the light sources and the light diffusibilities of the optical sheets. As a result of assessing the relationship between the luminance uniformity and various surface shapes of optical sheets, the inventors have arrived at the present disclosure as described below.

Namely, an optical sheet of the present disclosure is an optical sheet to be interposed between a plurality of small light sources and a prism sheet in a liquid crystal display device having the small light sources arranged in a dispersed manner at a side of the liquid crystal display device opposite to a display screen. The optical sheet has at least one surface with unevenness. When at least one scope of 0.5 mm square or more of the surface of the optical sheet having the unevenness is measured, height data of each of a plurality of pixels of an image obtained is determined, an approximated surface is calculated, from the height data of each pixel, for a minute region of 100 μm$^2$ or less including a plurality of pixels, and a calculation is repeatedly performed to obtain an inclination angle between: (i) a flat surface (with a height of 0) appearing after the unevenness is imaginarily removed and: (ii) the approximated surface, while two-dimensionally shifting the minute region at equal intervals along the flat surface by using at least one of the pixels as a unit to obtain a plurality of minute regions, a total area of some of the minute regions each having the inclination angle of 30° or more, accounts for 30% or more of a total area of all the minute regions, for which the calculation is made.

With the present disclosure, the unevenness is controlled so that the total area of the minute regions with surfaces inclined at inclination angles of 30° or more accounts for 30% or more of the total area of all the minute regions for which the inclination angles are obtained. The inclination angles are obtained by approximating the surfaces of the minute regions with the unevenness to flat surfaces, while shifting the minute region with the predetermined projection area with respect to the imaginary plane of the optical sheet along the imaginary plane to obtain the minute regions at respective points on the imaginary plane. This control promotes the reflection of the light incident on the optical sheet from the small light sources. Specifically, for example, multiple reflections in the optical sheet and multiple reflections between the reflection sheet, on which the light sources are placed, and the optical sheet are promoted. As a result, even if the distance between the light sources and the optical sheet decreases in the direct backlight provided with the plurality of light sources such as LEDs, non-uniformity of the luminance between the small light sources and the areas between the light sources on the light emitting surface sufficiently decreases.

BRIEF DESCRIPTION OF THE FIGURES

FIG. 9 illustrates a luminance distribution at a light source.

FIG. 10 illustrates a distribution in the x direction of the luminance distribution shown in FIG. 9.

FIG. 22 illustrates values of the "content of diffusing agent", the "film thickness", the "surface shape and surface roughness", the "FWHM" and the like of optical sheets of Examples 6 to 20.

FIG. 25 illustrates values of the "content of diffusing agent", the "film structure", the "luminance uniformity", and the like of optical sheets of Examples 21 to 32.

DETAILED DESCRIPTION OF VARIOUS EMBODIMENTS

The following describes, with reference to the drawings, an optical sheet, a backlight unit, a liquid crystal display device, and an information device of an embodiment of the present disclosure. The scope of the present disclosure is not limited to the following embodiment, and any given modification is possible within the scope of the technical thought of the present disclosure.

Figure 1:
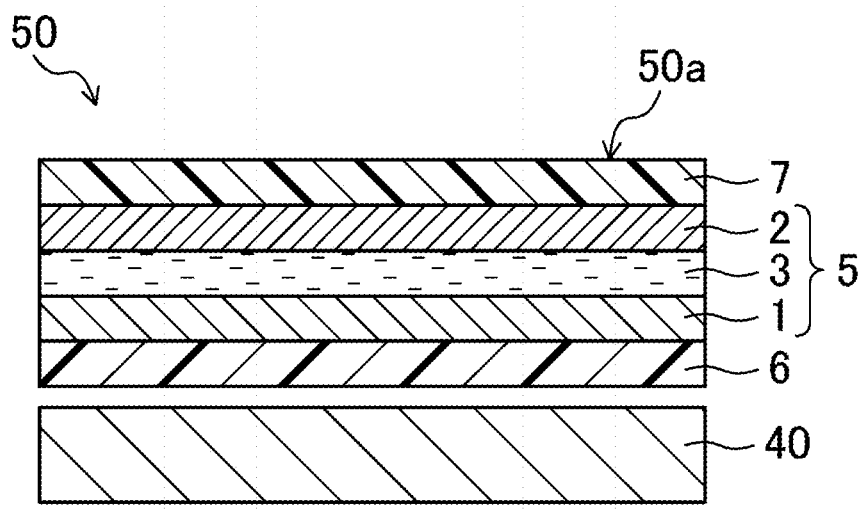
FIG. 1 is a cross-sectional view of a liquid crystal display device of an embodiment.
Figure 2:
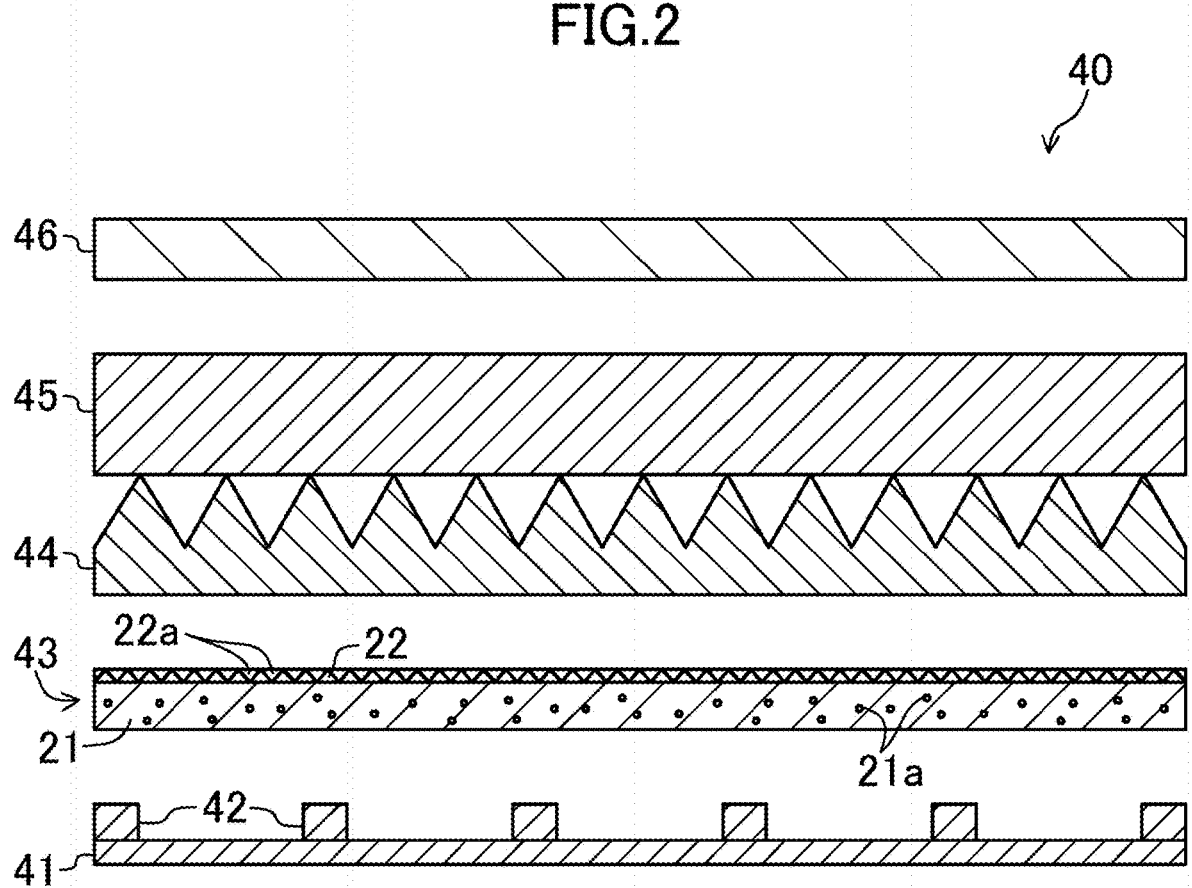
FIG. 2 is a cross-sectional view of a backlight unit of the embodiment.
Figure 3:
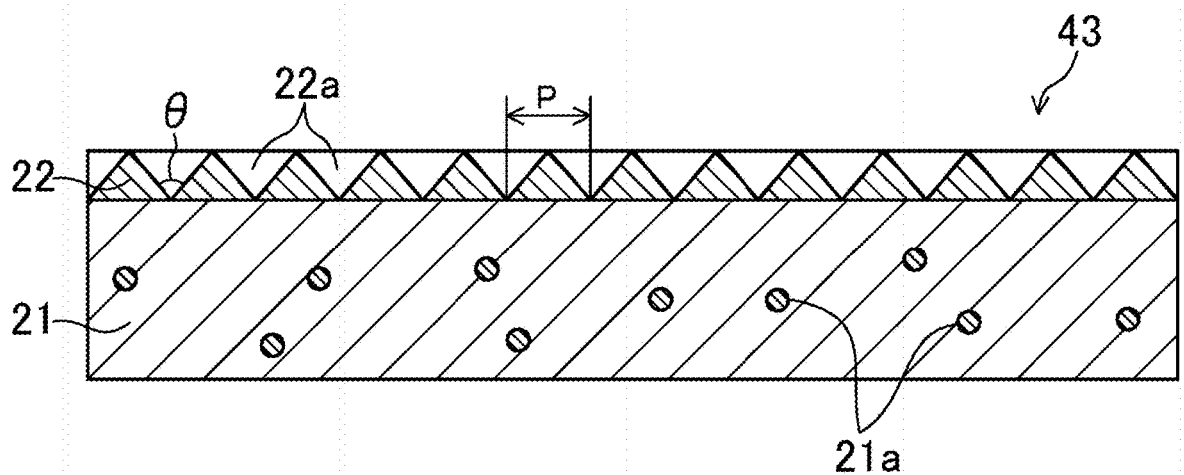
FIG. 3 is a cross-sectional view of an optical sheet of the embodiment.

FIG. 1 is an exemplary cross-sectional view of a liquid crystal display device of the present embodiment. FIG. 2 is an exemplary cross-sectional view of a backlight unit of the present embodiment. FIG. 3 is an exemplary cross-sectional view of an optical sheet of the present embodiment.

As shown in FIG. 1, the liquid crystal display device 50 includes a liquid crystal display panel 5, a first polarizing plate 6 attached to a back surface of the liquid crystal display panel 5, a second polarizing plate 7 attached to a front surface of the liquid crystal display panel 5, and a backlight unit 40 provided close to the back surface of the liquid crystal display panel 5 with the first polarizing plate 6 interposed therebetween. The liquid crystal display panel 5 includes a TFT substrate 1 and a CF substrate 2 which are provided so as to face each other, a liquid crystal layer 3 which is provided between the TFT substrate 1 and the CF substrate 2, and a sealing material (not illustrated) which is provided in a frame shape so as to enclose the liquid crystal layer 3 between the TFT substrate 1 and the CF substrate 2.

The shape of a display screen 50a of the liquid crystal display device 50 as viewed from the front (from above in the figure) is basically a rectangular or square shape; however, the shape of the display screen 50a is not limited to this and may have a rectangular shape with rounded corners, an elliptical shape, a circular shape, a trapezoidal shape, or any given shape of an instrument panel of an automobile, and the like.

In the above-described liquid crystal display device 50, a predetermined voltage is applied to the liquid crystal layer 3 in sub-pixels corresponding to the respective pixel electrodes to change the alignment state of the liquid crystal layer 3, thereby adjusting the transmittance of light incident from the backlight unit 40 through the first polarizing plate 6. Then, the light thus adjusted is emitted through the second polarizing plate 7, thereby displaying an image.

The liquid crystal display device 50 of the present embodiment is used as a display device to be built in various information devices (e.g., an on-board device such as a car navigation system, a personal computer, a mobile phone, a portable information terminal, a portable game machine, a copy machine, a ticket vending machines, an automatic teller machine, and the like).

The TFT substrate 1 includes, for example, a plurality of TFTs, an interlayer insulating film, a plurality of pixel electrodes, and an alignment film. The plurality of TFTs are arranged in a matrix on a glass substrate. The interlayer insulating film covers each of the TFTs. The plurality of pixel electrodes are arranged in a matrix on the interlayer insulating film, and are connected to the respective TFTs. The alignment film covers each of the pixel electrodes. The CF substrate 2 includes, for example, a lattice-like black matrix formed on a glass substrate, color filters including red layers, green layers, and blue layers arranged in open regions of the lattice of the black matrix, a common electrode covering the black matrix and the color filter, and an alignment film covering the common electrode. The liquid crystal layer 3 is made of, e.g., a nematic liquid crystal material including liquid crystal molecules having electrooptic characteristics. Each of the first polarizing plate 6 and the second polarizing plate 7 includes, for example, a polarizer layer having a polarization axis in one direction, and a pair of protective layers sandwiching the polarizer layer.

As shown in FIG. 2, the backlight unit 40 includes a reflection sheet 41, a plurality of small light sources 42 two-dimensionally arranged on the reflection sheet 41, an optical sheet 43 arranged above the small light sources 42, a first prism sheet 44 and a second prism sheet 45 arranged in this order above the optical sheet 43, and a polarizer sheet 46 arranged above the second prism sheet 45.

The reflection sheet 41 is configured as, e.g., a white film made of a polyethylene terephthalate resin, or a silver evaporated film.

The type of the small light source 42 is not limited. For example, an LED element, a laser element, or the like may be used. For the sake of productivity, an LED element may be adopted. Each of the small light sources 42 may have a rectangular shape in plan view. In such a case, the length of one side may be 10 μm or longer (preferably, 50 μm or longer) and 20 mm or shorter (preferably, 10 mm or shorter and more preferably 5 mm or shorter). In cases of adopting an LED as the small light source 42, a plurality of LED chips of several millimeters square may be arranged on the reflection sheet 41 at regular intervals. A lens may be provided to the LED to adjust the light emitting angle characteristics of the LED to serve as the small light source 42.

The optical sheet 43 has a diffusion layer 21, and an uneven layer 22 formed on the diffusion layer 21, as shown in FIG. 3. For example, the diffusion layer 21 is made of polycarbonate as a base material, and contains about 0.5 to 4% by mass of the diffusing agent 21a with respect to 100% by mass of the base material. The diffusing agent 21a may be made of a known material as appropriate. For example, the uneven layer 22 is made of clear polycarbonate. On the surface of the uneven layer 22, for example, recesses 22a each having an inverted pyramid shape are two-dimensionally arrayed. The vertex angles θ of the recesses 22a are 90°, for example. The recesses 22a are arranged at pitch p of about 100 for example. The optical sheet 43 may have a single-layer structure containing a light diffusing agent and having an uneven surface. As should be understood, the optical sheet 43 is not limited to the one shown in FIG. 3. For example, the optical sheet may have a single-layer structure with unevenness, or may be a multi-layer of three or more layers including an uneven layer. The uneven layer is formed not only by two-dimensionally arranging the recesses in the inverted pyramid shapes as described above, but also may be formed by randomly arranging projections and recesses.

The first prism sheet 44 and the second prism sheet 45 are, for example, each a film having a plurality of adjacent grooves having an isosceles triangle-shaped cross-section, an adjacent pair of the grooves forming a prism whose vertex angle is about 90°. Here, the grooves formed in the first prism sheet 44 and the grooves formed in the second prism sheet 45 are disposed so as to be orthogonal to each other. The first prism sheet 44 and the second prism sheet 45 may be integrally formed. For example, the first prism sheet 44 and the second prism sheet 45 may be a polyethylene terephthalate (PET) film having prism shapes made of a UV-curable acrylic resin.

For example, the polarizer sheet 46 may be a DBEF series manufactured by 3M. The polarizer sheet 46 improves the luminance of the display screen 50a, by blocking absorption of the light emitted from the backlight unit 40 into the first polarizing plate 6 of the liquid crystal display device 50.

One feature of the present embodiment resides in the following point. Namely, at least one surface of the optical sheet 43 has an unevenness. In the optical sheet 43, a total area of some of minute regions, which have surfaces inclined at inclination angles of 30° or more from an imaginary plane of the optical sheet 43, accounts for 30% or more of a total area of all the minute regions, for which the inclination angles are obtained by approximating the surfaces of the minute regions with the unevenness to flat surfaces, while two-dimensionally shifting a minute region with a predetermined projection area with respect to the imaginary plane of the optical sheet 43 at equal intervals along the imaginary plane to obtain the minute regions at respective points on the imaginary plane.

Here, the imaginary plane of the optical sheet 43 means a flat surface which remains after removing the unevenness of the optical sheet 43. More specifically, the "imaginary plane" denotes an imaginary plane provided horizontally in contact with the deepest points of the recesses of the unevenness. However, the term "horizontally" here means being in parallel to the horizontal plane of the optical sheet 43, and does not mean the horizontal direction in a strict sense. For example, if the surface of the optical sheet 43 opposite to the uneven surface is flat or substantially flat, the imaginary plane may be provided in parallel to the opposite surface.

Figure 4A:
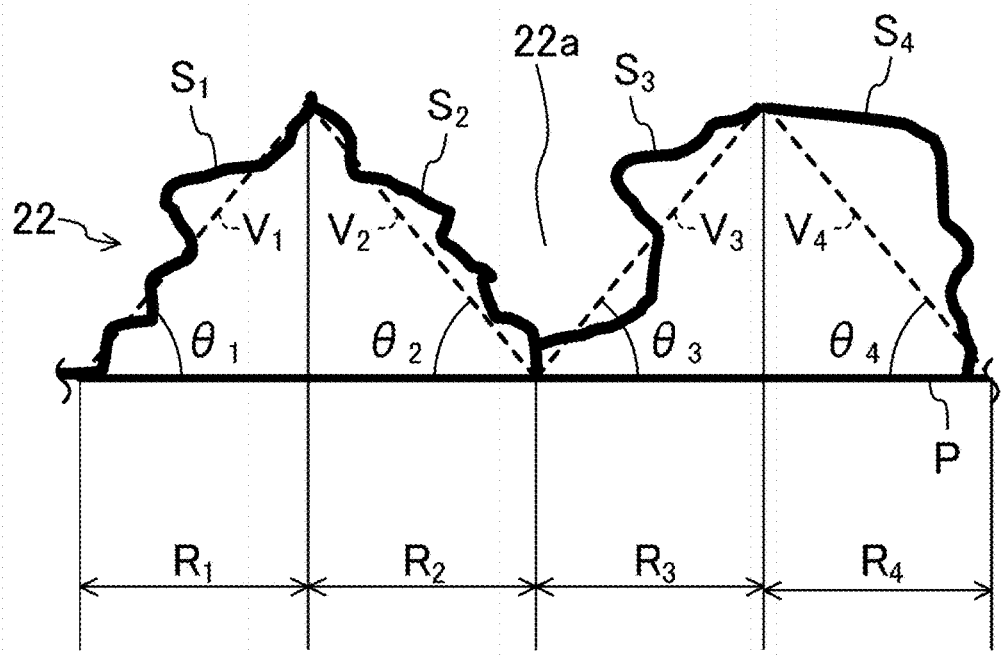
FIG. 4 includes two illustrations, the first being an illustration A that illustrates an example of obtaining inclination angles of surfaces of minute regions in the optical sheet of the embodiment. The inclination angles are obtained by approximating the surfaces of the minute regions with unevenness to flat surfaces, while a minute region with a predetermined projection area is shifted along the imaginary plane. Illustration B of FIG. 4 illustrates another example of obtaining inclination angles of surfaces of minute regions in the optical sheet of the embodiment. The inclination angles are obtained by approximating the surfaces of the minute regions with unevenness to flat surfaces, while a minute region with a predetermined projection area is shifted along the imaginary plane.
Figure 4B:
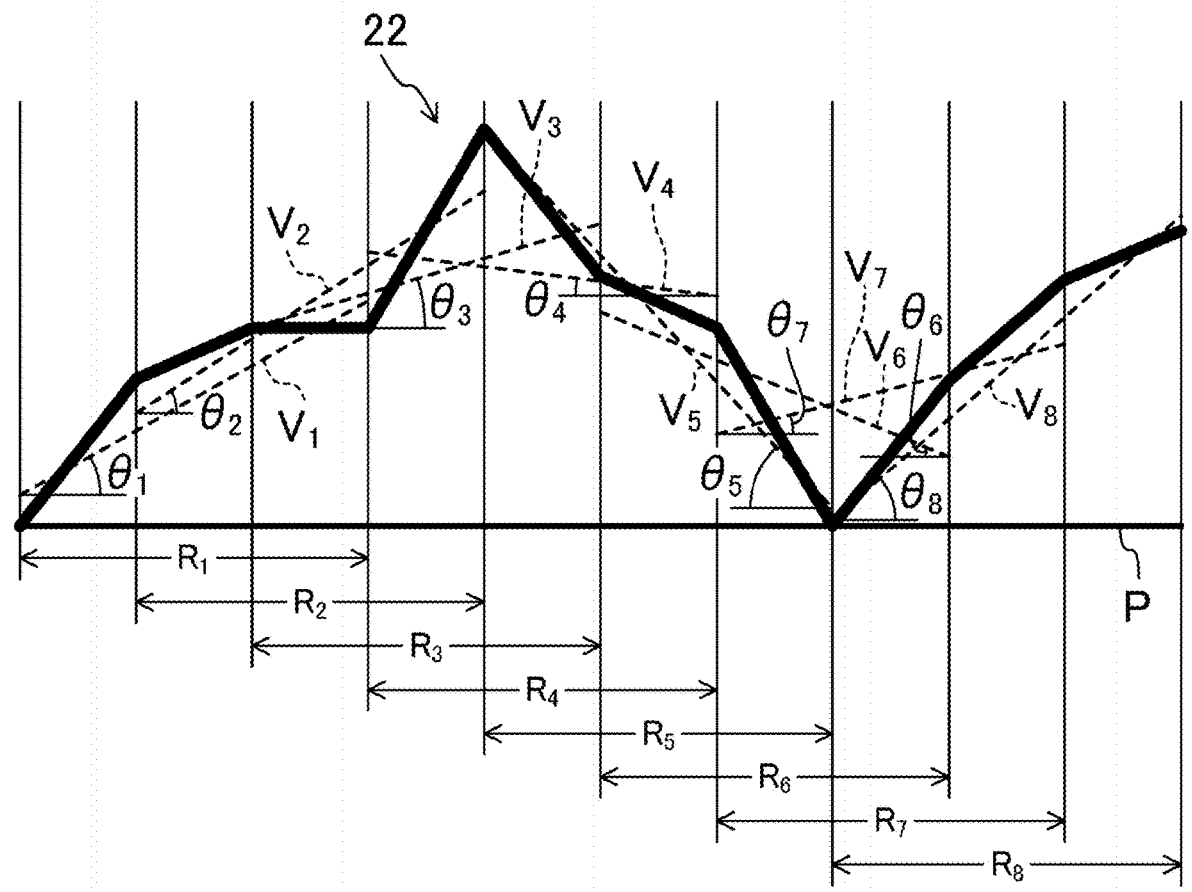

FIG. 4A illustrates an example of obtaining inclination angles (e.g., $\theta1, \theta2, \theta3, \ldots$) of surfaces (e.g., V1, V2, V3, ...) of minute regions (e.g., R1, R2, R3, ...) from an imaginary plane (P) of the optical sheet 43 (specifically, the uneven layer 22) in each optical sheet 43. The inclination angles are obtained by approximating the surfaces of the minute regions with unevenness (e.g., S1, S2, S3, ...) to flat surfaces, while shifting a minute region with a predetermined projection area along the imaginary plane to obtain the minute regions at respective points on the imaginary plane. In FIG. 4A, the minute region is shifted in accordance with the inclined surfaces of the unevenness for simplification. In practice, however, the minute region is shifted two-dimensionally at equal intervals, regardless of the state of the unevenness as shown in FIG. 4B. At this time, the minute region at the point after the shift may overlap the minute region at the point before the shift.

Figure 5:
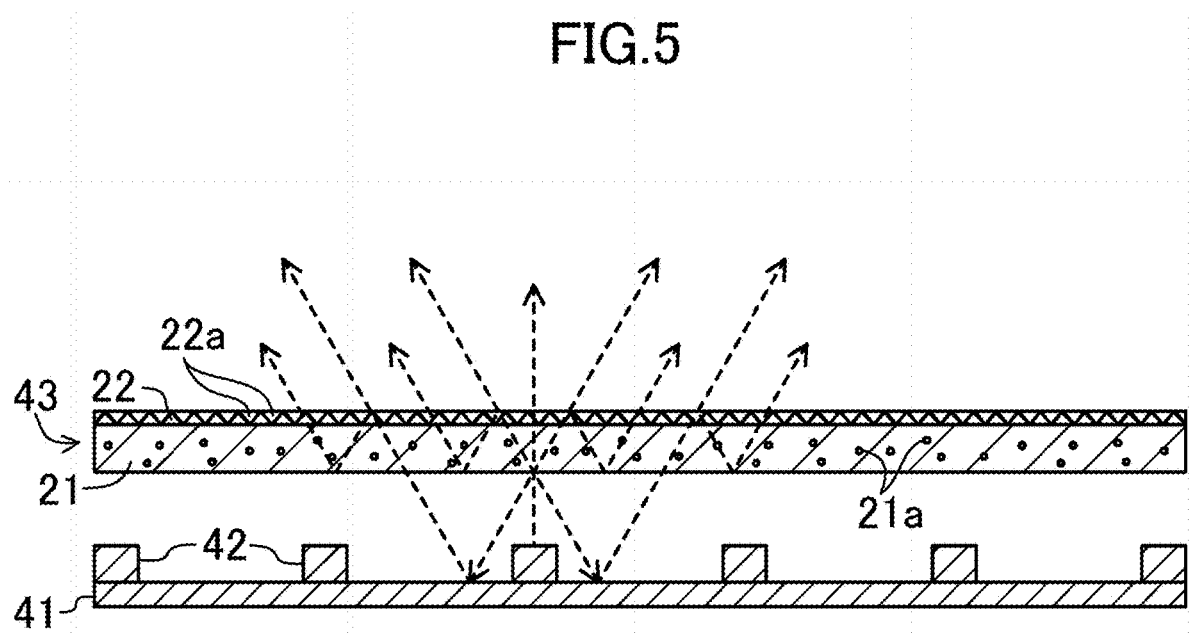
FIG. 5 illustrates that light incident from a light source is reflected by an optical sheet of the embodiment.

With the above-described embodiment, the unevenness is controlled so that the total area of the minute regions with surfaces inclined at inclination angles of 30° or more accounts for 30% or more of the total area of all the minute regions, for which the inclination angles are obtained. The inclination angles are obtained by approximating the surfaces of the minute regions with the unevenness to flat surfaces, while shifting the minute region with the predetermined projection area with respect to the imaginary plane of the optical sheet 43 along the imaginary plane to obtain the minute regions at respective points on the imaginary plane. As shown in FIG. 5, this control promotes the reflection of the light incident on the optical sheet 43 from a plurality of small light sources 42. Specifically, for example, multiple reflections in the optical sheet 43 and multiple reflections between the reflection sheet 41, on which the light sources 42 are placed, and the optical sheet 43 are promoted. As a result, even if the distance between the small light sources 42 and the optical sheet 43 decreases in the direct backlight unit 40 provided with the plurality of light sources 42 such as LEDs, non-uniformity of the luminance between the small light sources 42 and the areas between the light sources on the light emitting surface sufficiently decreases.

In the present embodiment, the number of the small light sources 42 is not limited. However, to be distributed, the light sources 42 may be arranged regularly on the reflection sheet 41 in one preferred embodiment. The phrase "arranged regularly" means that arranged with a certain regularity. Examples include the case where the small light sources 42 are arranged at equal intervals. If the small light sources 42 are arranged at equal intervals, the distance between the centers of two adjacent small light sources 42 may fall within a range from 0.5 mm (2 mm in one preferred embodiment) to 20 mm, both inclusive. A distance of 0.5 mm or more between the centers of two adjacent small light sources 42 tends to cause a phenomenon (non-uniformity of the luminance) that the region between the adjacent small light sources 42 has a lower luminance than the other regions. This makes the present embodiment more useful.

Figure 6:
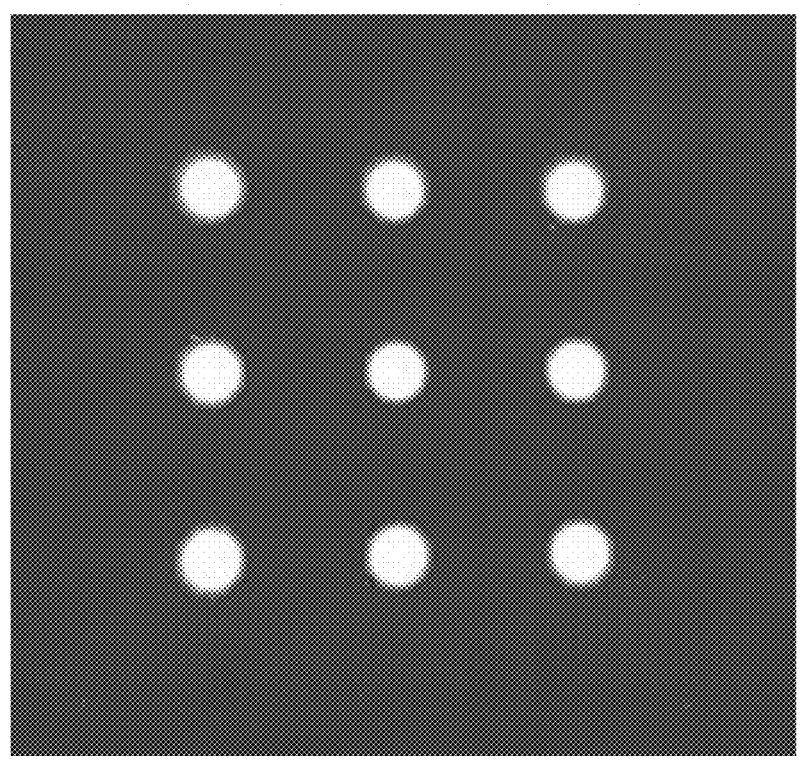
FIG. 6 illustrates LED light sources viewed from above.
Figure 7:
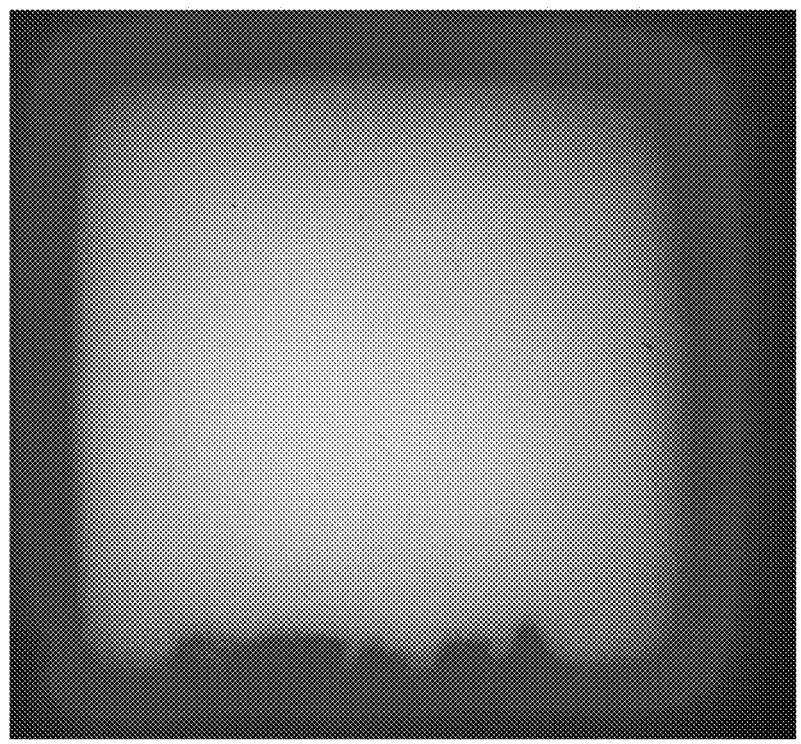
FIG. 7 illustrates LED light sources viewed from above through the optical sheet of the embodiment.
Figure 8:
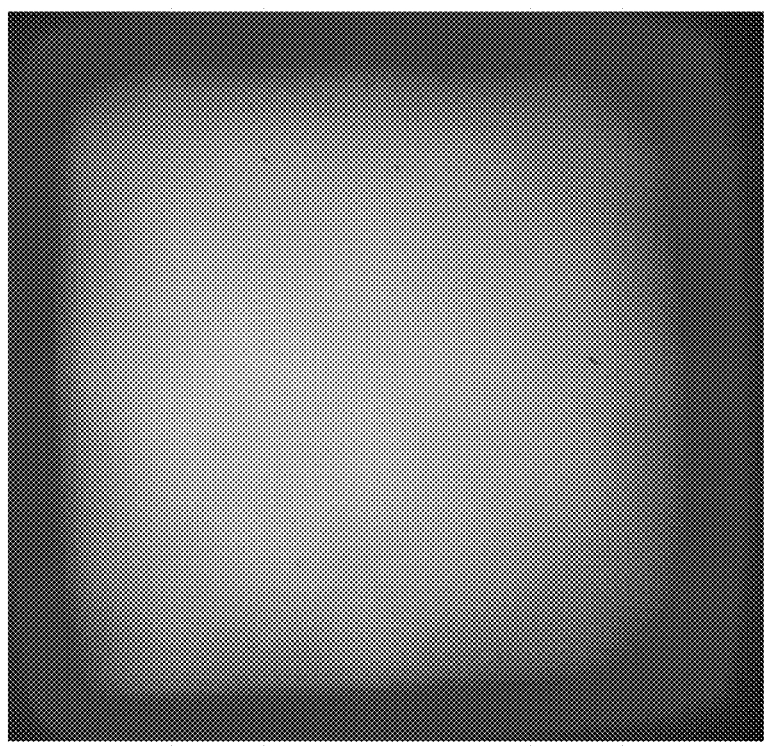
FIG. 8 illustrates LED light sources viewed from above through a traditional optical sheet.

FIG. 6 illustrates LED light sources viewed from above. FIG. 7 illustrates LED light sources viewed from above through the optical sheet 43 of the present embodiment. FIG. 8 illustrates LED light sources viewed from above through a traditional optical sheet (the ratio of the total area with surfaces inclined at inclination angles of 30° or more is less than 30%).

While the optical sheet 43 of the present embodiment decreases the non-uniformity of the luminance between the light sources and the space between the light sources as shown in FIG. 7, there is non-uniformity of the luminance between the light sources and the space between the light sources with the traditional optical sheet as shown in FIG. 8.

The shapes of the unevenness of the surface of optical sheet 43 are not uniform and may be different to some extent (see FIG. 4A), since the processing accuracy is limited in industrial production. In this case, the inclination angles of the surfaces (i.e., the approximated surfaces) of the minute regions on the uneven surface of the optical sheet 43 are different within a range from 0° to 90°. In this embodiment, the unevenness is controlled so that 30 percent of the surfaces have inclination angles of 30° or more when the differences are aggregated. In particular, an optical sheet 43 made of plastic film has difficulty in uniformizing the projections or recesses on the surfaces of the light diffusers 43. It is thus largely advantageous to apply this embodiment, which assumes that the inclination angles of the surfaces of the minute regions are different.

While the upper surface (i.e., the surface closer to the first prism sheet 44) of the optical sheet 43 is uneven (i.e., has recesses 22a) in this embodiment, at least one of the surfaces of the optical sheet 43 may be uneven. That is, the lower surface (i.e., the surface closer to the small light source 42) or both the surfaces (i.e., the upper and lower surfaces) of the optical sheet 43 may be uneven.

The unevenness of the surfaces of the optical sheet 43 is not limited, as long as the inclination angles of the surfaces of the minute regions are measurable by, for example, a method described later. The uneven surface may be, for example, a matte surface with a random pitch, arrangement, or shape. Alternatively, a plurality of projections and recesses may be arranged two-dimensionally.

The unevenness of the surfaces of the optical sheet 43 may include polygonal pyramids or shapes that can be approximated to polygonal pyramids. Here, the term "polygonal pyramid" means a triangular pyramid, quadrangular pyramid or hexagonal pyramid which can be arranged tightly on the surfaces of the optical sheet 43 in one preferred embodiment. The tight arrangement of the polygonal pyramids and the shapes that can be approximated to the polygonal pyramids on the surface of the optical sheet 43 reduces the total area of the regions inclined at inclination angles of 0° from the imaginary plane of the optical sheet 43. In addition, the surface of the optical sheet 43 is formed uneven by a manufacturing process such as extrusion molding or injection molding using a die (e.g., metal rolls). In view of the accuracy in cutting the surface of the die (or each metal roll), the polygonal pyramids may be quadrangular pyramids.

Examples of the projections may include hemispheres (i.e., upper halves), cones, triangular pyramids, quadrangular pyramids, and hexagonal pyramids. Examples of the recesses may include hemispheres (i.e., lower halves), inverted cones, inverted triangular pyramids, inverted quadrangular pyramids, and inverted hexagonal pyramids.

Examples of the projections may further include substantial hemispheres (i.e., upper halves), substantial cones, substantially triangular pyramids, substantially quadrangular pyramids, and substantially hexagonal pyramids. Examples of the recesses may further include substantial hemispheres (i.e., lower halves), substantially inverted cones, substantially inverted triangular pyramids, substantially inverted quadrangular pyramids, and substantially inverted hexagonal pyramids. Here, the phrase "substantial(ly) XX" means that shapes can be approximated to the XX. For example, the phrase "substantially quadrangular pyramids" means that shapes can be approximated to the quadrangular pyramids. In fact, the projections and recesses may be deformed from substantial hemispheres (i.e., upper and lower halves), substantial cones (or substantially inverted cones), substantially (inverted) triangular pyramids, or substantially (inverted) quadrangular pyramids in view of the accuracy in industrial production. There may be inevitable variations in the shapes caused by the processing accuracy of industrial production.

If a plurality of projections and recesses are arranged two-dimensionally on the surface of the optical sheet 43, the projections and recesses may be arranged tightly over the entire surfaces of the optical sheet 43. Alternatively, the projections and recesses may be arranged at regular intervals (i.e., a constant pitch) or irregular intervals.

In this embodiment, as long as the inclination angles of the uneven surfaces of the optical sheet 43 can be obtained for each minute region, the method of calculating the inclination angles is not limited. For example, the following method may be employed.

Step 1: With the use of a laser microscope VK-100 manufactured by Keyence Corporation, the surface shapes of the optical sheet 43 are measured at a magnification of 400. Automatic inclination correction is then performed to collect the height data of 1024 pixels horizontally×768 pixels vertically (or 697 μm×522.6 μm) as a comma-separated values (CSV) file. For example, the height may be measured as follows. First, after the point of focus is changed stepwise to obtain a plurality of confocal images to be measured, a variation curve of light intensity (I-Z curve) is estimated for each pixel based on the relationship between the discrete points of focus (Z) and the light detection intensity (I). From the I-Z curve, the peak position, that is, the height is obtained.

Step 2: The height data (digits) collected in Step 1 is converted into height data (μm) using a Z-calibration value.

Step 3: The height data obtained in the Step 2 is used to calculate a plane, to which the surface of a sheet in a minute region of 4×4 pixels (with an area (i.e., the projection area with respect to the imaginary plane of the optical sheet 43) of 7.29 μm$^2$) can be approximated, by a known mathematical method based on the data of the minute region.

Step 4: An angle between the approximated surface calculated in Step 3 with the imaginary plane of the optical sheet 43 (i.e., a plane having a height of 0) is calculated to serve the inclination angle of the minute region.

Step 5: Steps 3 and 4 are performed for minute regions at 500,000 or more points (specifically, 779,280 points), while horizontally or vertically shifting the minute region one pixel by one pixel.

Step 6: The percentage of the total area of the minute regions with inclination angles of 30° or more (hereinafter referred to simply as a "ratio of the area with inclination angles of 30° or more") to the total area of the minute regions at the 500,000 or more points measured in Step 5 is calculated.

In one preferred embodiment, the "ratio of the area with inclination angles of 30° or more" is calculated from the height data of the scope (in the range of 522.6 μm×697 μm in Step 1) of 0.5 mm square or more in view of the processing variations as described in Step 1, for example. As a matter of course, the height data may be obtained for a plurality of scopes of 0.5 mm square or more, or for the entire surface of the sheet as a scope to improve the accuracy of the data. With an increase in the scope, the number of the "minute regions" at which the inclination angles are calculated also increases. There is no particular upper limit to the number of the "minute regions," as long as they have no problem as resources for, for example, measurement or data processing. For example, if two scopes of 0.5 mm square or more are set, the number of "minute regions" also doubles. Also, even in the scope of the same size, the number of the "minute regions" increases with an increase in the number of pixels included in the scope. That is, the number of "minute regions" whose inclination angles are to be calculated depends on, for example, the size of the scope, the number of pixels included in the scope, and the areas of the minute regions; which will be described later. However, if the scope has an area of 0.5 mm square or more in view of processing variations, for example, the inclination angles of at least 100,000 or more (preferably 300,000 or more, and more preferably 500,000 or more) minute regions may be calculated to accurately figure out the unevenness.

In the above-described method described above, the inclination angle was calculated, while horizontally or vertically shifting the minute region of 4×4 pixels on a one-pixel basis. Instead, the inclination angle may be calculated, while horizontally or vertically shifting a minute region of the same size on a two-pixel basis. Alternatively, the inclination angle may be calculated, while horizontally or vertically shifting the minute region of a larger size (e.g., 8×8 pixels) on a four-pixel basis. In short, the pixel sizes of the minute regions and the pitch of shifting the minute region can be set freely, as long as unevenness is accurately figured out.

The area (i.e., the projection area respect to the imaginary plane of the optical sheet) of the minute region in measuring the inclination angle is not limited, as long as being sufficiently small to evaluate the reflection characteristics of light from a small light source at the micro level. In view of the measurement accuracy, the performance of measurement equipment or the like, the area may be 0.1 mm$^2$ or less (preferably 0.01 mm$^2$ or less, more preferably 0.001 mm$^2$ or less, and further preferably 0.0001 mm$^2$ (i.e., 100 μm$^2$) or less, 7.29 μm$^2$ in Step 3).

In this embodiment, the optical sheet 43 including the diffusion layer 21 with the diffusing agent 21a promotes light diffusion in the optical sheet 43, thereby further reducing the non-uniformity of the luminance between the small light sources 42 and the areas between the light sources.

The material of the diffusing agent 21a contained in the diffusion layer 21 is not limited. Examples may include silica, titanium oxide, aluminum hydroxide, and barium sulfate as inorganic particles, as well as acryl, acrylonitrile, silicone, polystyrene, and polyamide as organic particles.

The particle size of the diffusing agent 21a may fall within a range from 0.1 μm (preferably 1 μm) to 10 μm (preferably 8 μm), both inclusive, for example, in view of the light diffusing effect.

The concentration of the diffusing agent 21a may fall within a range from 0.1% (preferably 0.3%) by mass to 10% (preferably 8%) by mass, both inclusive, with respect to 100% by mass of the material (i.e., the matrix) of the diffusion layer 21, for example, in view of the light diffusing effect.

The difference in the refractive index between the diffusing agent 21a and the matrix of the diffusion layer 21 may be 0.01 or more, preferably 0.03 or more, more preferably 0.05 or more, further more preferably 0.1 or more, and most preferably 0.15 or more. A difference of less than 0.01 between refractive index of the diffusing agent 21a and the refractive index of the matrix of the diffusion layer 21 causes insufficient diffusion effects of the diffusing agent 21a.

The resin to be the matrix of the diffusion layer 21 is not limited, as long as being a material that transmits light. Examples may include acryl, polystyrene, polycarbonate, methyl methacrylate-styrene copolymer (an MS resin), polyethylene terephthalate, polyethylene naphthalate, cellulose acetate, and polyimide.

The thickness of the optical sheet 43 of this embodiment is not limited, but may fall, for example, within a range from 0.1 mm to 3 mm (preferably to 2 mm, more preferably to 1.5 mm, and further more preferably to 1 mm), both inclusive. The optical sheet 43 with a thickness larger than 3 mm makes it difficult to achieve a reduction in the thickness of the liquid crystal display. On the other hand, the optical sheet 43 with a thickness smaller than 0.1 mm makes it difficult to achieve the effect of improving the luminance uniformity, which has been described above.

If an optical sheet has a multilayer structure (e.g., the diffusion layer 21 as the lower layer and the uneven layer 22 as the upper layer) like the optical sheet 43 of this embodiment, a layer (i.e., the uneven layer 22) with an uneven surface has a thickness that is greater than the maximum height or depth of the unevenness. For example, a layer with projections (or recesses) with height (or depth) of 20 μm has a thickness larger than 20 μm.

In this specification, the term "optical sheet" means a sheet having an optical function such as diffusion, collection, refraction, and reflection. As described above, the optical sheet 43 of this embodiment includes, on the diffusion layer 21, the uneven layer 22 with the uneven surface of the present disclosure. The optical sheet 43 may be replaced with a single-layer optical sheet 43 containing a diffusing agent and having an uneven surface. Alternatively, the optical sheet 43 may contain three or more layers including the diffusion layer 21 and the uneven layer 22. Alternatively, the diffusion layer 21 and the uneven layer 22 may be independent optical sheets, which may be layered or independently arranged. In the latter case, the uneven layer 22 may be disposed closer to the small light sources 42. Alternatively, the optical sheet 43 may only include the diffusion layer 21 and the lower surface of the first prism sheet 44 may have the unevenness of the present disclosure. That is, the unevenness of the present disclosure may be arranged on the surface of any optical sheet constituting the backlight unit 40. It is, however, effective to arrange the unevenness of the present disclosure to the surface of the diffusion sheet arranged closest to (directly above) the small light sources 42, to improve the reflection characteristics.

A method of manufacturing the optical sheet 43 is not limited. For example, extrusion molding or injection molding may be employed. Single-layer diffusion sheets with uneven surfaces may be manufactured by extrusion molding as follows. First, plastic particles as pellets added with a diffusing agent are introduced into a single-screw extruder. In addition, those plastic particles which are not added with any diffusing agent may also be mixed. The plastic particles are molten and kneaded while being heated. A molten resin extruded through T-dies is then sandwiched between two metal rolls and cooled. After that, the resin is transported by guide rolls to be cut off into sheet plates by a sheet cutter machine, resulting in fabrication of the diffusion sheet. Here, the molten resin is sandwiched between the metal rolls, one of which has a surface with predetermined inverted unevenness, which will be transferred onto the resin. This allows for shaping of diffusion sheets to have surfaces with the desired unevenness. However, the surface shapes of the rolls are not 100% transferred onto the resin and may thus be counted backward from the degree of transfer to be designed.

If a double-layer diffusion sheet with uneven surfaces is manufactured by extrusion molding, for example, plastic particles as pellets necessary for forming each layer are introduced into one of two single-screw extruders. The procedure as above is then performed for each layer. The fabricated sheets are layered.

Alternatively, plastic particles as pellets necessary for forming each layer are introduced into one of two single-screw extruders. The plastic particles are molten and kneaded while being heated. After that, molten resins to be the layers are introduced into a single T-die to be layered therein. The multilayer of the molten resins extruded through the T-die is then sandwiched between two metal rolls and cooled. After that, the multilayer is transported by guide rolls to be cut off into sheet plates using a sheet cutter machine, resulting in fabrication of a double-layer diffusion sheet with an uneven surface.

In this embodiment, the backlight unit 40 is a direct backlight unit in which a plurality of small light sources 42 are distributed at a side of the liquid crystal display device 50 opposite to a display screen 50a. A decrease in the distance between the small light sources 42 and the optical sheet 43 is needed to miniaturize the liquid crystal display device 50. However, a decrease in this distance tends to cause the phenomenon (i.e., non-uniformity of luminance) that the regions of the display screen 50a above the spaces between the distributed small light sources 42 have a lower luminance than the other regions.

By contrast, the optical sheet of the present disclosure with uneven surfaces as described above is useful to reduce such non-uniformity of luminance. In particular, the present disclosure is believed to be more useful if the distance between the small light sources and the optical sheet is set 15 mm or less, preferably 10 mm or less, more preferably 5 mm or less, further more preferably 2 mm or less, and ultimately 0 mm, aiming to reduce the thickness of small to medium size liquid crystal display in the future.

Examples and Comparative Example

The following describes an optical sheet of Examples and Comparative Examples.

The steps 1 to 6 described above were used to calculate the inclination angles of the uneven surfaces of the optical sheet in the examples, and to calculate the "ratio of the area with inclination angles of 30° or more" of the optical sheet in the examples.

The luminance uniformity was evaluated as follows in each example to provide universal evaluation considering the influence of the light-emitting characteristics of LEDs used as light sources and the arrangement of LEDs. First, after one LED had been turned on, the luminance of the LED image on the two-dimensional plane was measured from the upper side of a polarizer sheet (e.g., DBEF series manufactured by 3M) to obtain variations in the luminance according to the distance from the center of the LED. At that time, the optical sheet to be evaluated was disposed at a certain distance from the LED, two prism sheets were layered on the optical sheet with their ridge lines orthogonal to each other, and the polarizer sheet was disposed on the prism sheets. FIG. 9 illustrates a two-dimensional luminance distribution of an LED image obtained by the two-dimensional luminance measurement described above using RISACOLOR manufactured by HI-LAND. Next, a luminance variation curve was extracted along a straight line (i.e., a white line extending along the x-axis in FIG. 9) passing through the central point of the LED to form a graph with the horizontal axis representing the distance from the center of the LED and the vertical axis representing a relative luminance to the maximum luminance of 1, as shown in FIG. 10. The width of the graph along the horizontal axis was obtained at the relative luminance of 0.5, as the full width at half maximum (FWHM). The width of the graph along the horizontal axis was obtained at the relative luminance of 0.1, as the FW0.1M. A larger FWHM means a wide spread of light and improved luminance uniformity. The FWHM was thus used to evaluate the luminance uniformity in each of the examples.

In each example, the base resin (i.e., the matrix) of the optical sheet is made of polycarbonate with a refractive index of 1.59, whereas the diffusing agent added to the base resin is made of silicone with a refractive index 1.43. That is, the difference in refractive index between the base resin and the diffusing agent is 0.16 in the optical sheet of each example.

Comparative Example 1

An optical sheet according to Comparative Example 1 was fabricated by the following method. First, a resin containing 5% by mass of a diffusing agent with respect to 100% by mass of a base resin was subjected to extrusion molding to form a film. Then, as one of two rolls, a roll having a random matte surface with Ra (arithmetic mean roughness) of 4.5 μm was pressed onto the resin film at a linear pressure of 30 kg/cm to transfer its surface shape to the resin film, thereby fabricating a single-layer optical sheet (thickness: 1 mm) having unevenness on its surface.

Figure 11:
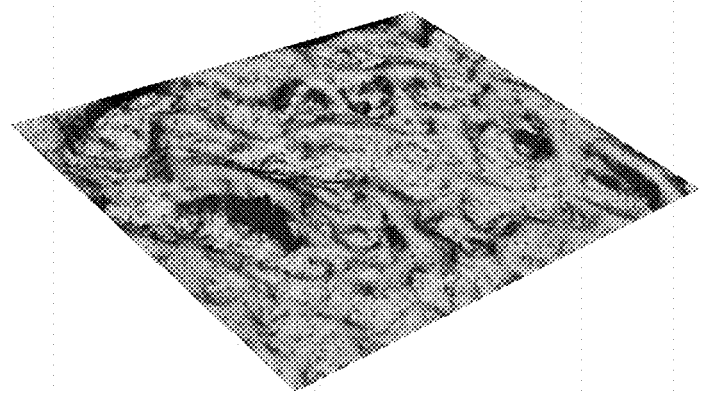
FIG. 11 is a picture of a surface shape of an optical sheet of Comparative Example 1
Figures 17, 18:
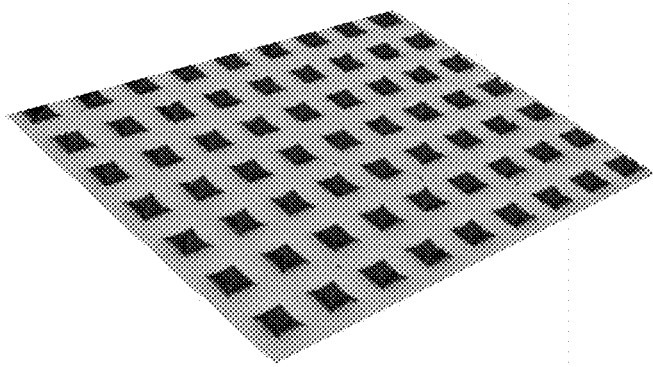
FIG. 17 is a picture of a surface shape of an optical sheet of Example 5
FIG. 18 illustrates values of the "roughness (Ra)", the "ratio of the area with inclination angles of 30° or more", and the "FWHM" of optical sheets of Examples 1 to 5 and those of Comparative Examples 1 and 2.

The surface shape of the optical sheet thus fabricated according to Comparative Example 1 is shown in FIG. 11. Further, values of the "Ra", the "ratio of the area with inclination angles of 30° or more", and the "FWHM" of the optical sheet of Comparative Example 1 are shown in FIG. 18. As shown in FIG. 18, in Comparative Example 1, the "Ra" is 3.632 μm, the "ratio of the area with inclination angles of 30° or more" is 25%, and the "FWHM" is 10.97434 mm.

Example 1

An optical sheet of Example 1 was fabricated by the following method. First, a resin containing 5% by mass of a diffusing agent with respect to 100% by mass of a base resin was subjected to extrusion molding to form a film. Then, as one of two rolls, a roll having a random matte surface with Ra of 14.0 μm was pressed onto the resin film at a linear pressure of 30 kg/cm to transfer its surface shape to the resin film, thereby fabricating a single-layer optical sheet (thickness: 1 mm) having unevenness on its surface.

Figure 12:
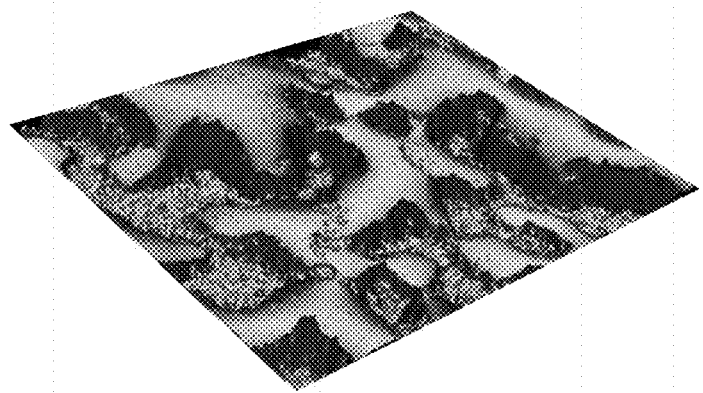
FIG. 12 is a picture of a surface shape of an optical sheet of Example 1

The surface shape of the optical sheet thus fabricated according to Example 1 is shown in FIG. 12. Further, values of the "Ra", the "ratio of the area with inclination angles of 30° or more", and the "FWHM" of the optical sheet of Example 1 are shown in FIG. 18. As shown in FIG. 18, in Example 1, the "Ra" is 11.427 μm, the "ratio of the area with inclination angles of 30° or more" is 36%, and the "FWHM" is 11.13328 mm.

Comparative Example 2

An optical sheet of Comparative Example 2 was fabricated by the following method. First, a resin containing 5% by mass of a diffusing agent with respect to 100% by mass of a base resin was subjected to extrusion molding to form a film. Then, as one of two rolls, a roll having pyramid shapes on its surface was pressed onto the resin film at a linear pressure of 5 kg/cm to transfer its surface shape to the resin film, thereby fabricating a single-layer optical sheet (thickness: 1 mm) having inverted pyramid shapes on its surface.

Figure 13:
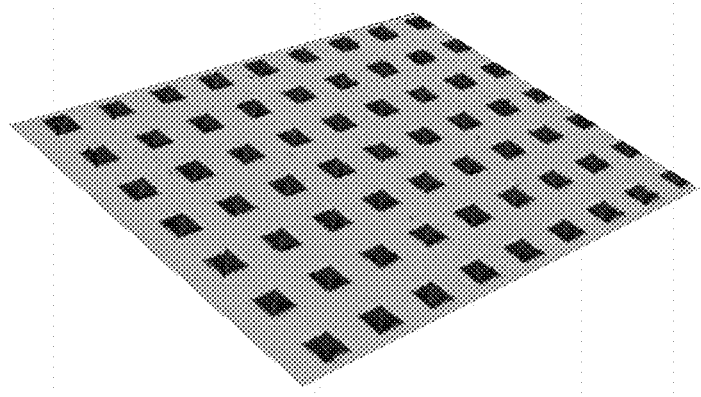
FIG. 13 is a picture of a surface shape of an optical sheet of Comparative Example 2

The surface shape of the optical sheet thus fabricated according to Comparative Example 2 is shown in FIG. 13. Further, values of the "Ra", the "ratio of the area with inclination angles of 30° or more", and the "FWHM" of the optical sheet of Comparative Example 2 are shown in FIG. 18. As shown in FIG. 18, in Comparative Example 2, the "Ra" is 0.443 μm, the "ratio of the area with inclination angles of 30° or more" is 17%, and the "FWHM" is 10.4808 mm.

Example 2

An optical sheet of Example 2 was fabricated by the following method. First, a resin containing 5% by mass of a diffusing agent with respect to 100% by mass of a base resin was subjected to extrusion molding to form a film. Then, as one of two rolls, a roll having pyramid shapes on its surface was pressed onto the resin film at a linear pressure of 10 kg/cm to transfer its surface shape to the resin film, thereby fabricating a single-layer optical sheet (thickness: 1 mm) having inverted pyramid shapes on its surface.

Figure 14:
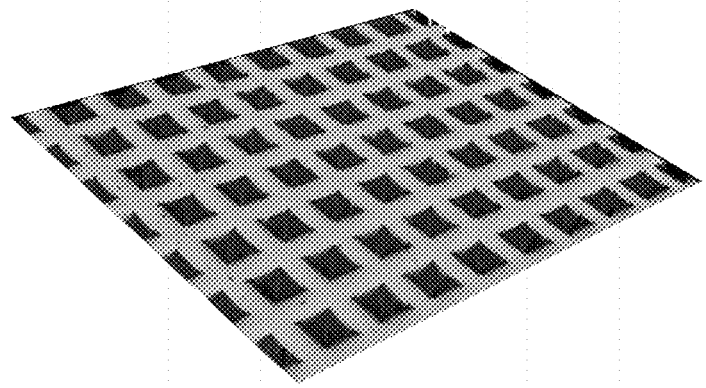
FIG. 14 is a picture of a surface shape of an optical sheet of Example 2

The surface shape of the optical sheet thus fabricated according to Example 2 is shown in FIG. 14. Further, values of the "Ra", the "ratio of the area with inclination angles of 30° or more", and the "FWHM" of the optical sheet of Example 2 are shown in FIG. 18. As shown in FIG. 18, in Example 2, the "Ra" is 0.528 μm, the "ratio of the area with inclination angles of 30° or more" is 30%, and the "FWHM" is 11.145 mm.

Example 3

An optical sheet of Example 3 was fabricated by the following method. First, a resin containing 5% by mass of a diffusing agent with respect to 100% by mass of a base resin was subjected to extrusion molding to form a film. Then, as one of two rolls, a roll having pyramid shapes on its surface was pressed onto the resin film at a linear pressure of 20 kg/cm to transfer its surface shape to the resin film, thereby fabricating a single-layer optical sheet (thickness: 1 mm) having inverted pyramid shapes on its surface.

Figure 15:
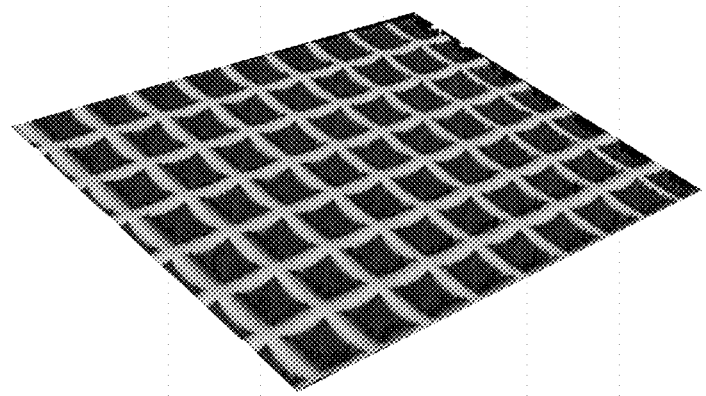
FIG. 15 is a picture of a surface shape of an optical sheet of Example 3

The surface shape of the optical sheet thus fabricated according to Example 3 is shown in FIG. 15. Further, values of the "Ra", the "ratio of the area with inclination angles of 30° or more", and the "FWHM" of the optical sheet of Example 3 are shown in FIG. 18. As shown in FIG. 18, in Example 3, the "Ra" is 1.070 μm, the "ratio of the area with inclination angles of 30° or more" is 52%, and the "FWHM" is 11.201 mm.

Example 4

An optical sheet of Example 4 was fabricated by the following method. First, a resin containing 5% by mass of a diffusing agent with respect to 100% by mass of a base resin was subjected to extrusion molding to form a film. Then, as one of two rolls, a roll having pyramid shapes on its surface was pressed onto the resin film at a linear pressure of 35 kg/cm to transfer its surface shape to the resin film, thereby fabricating a single-layer optical sheet (thickness: 1 mm) having inverted pyramid shapes on its surface.

Figure 16:
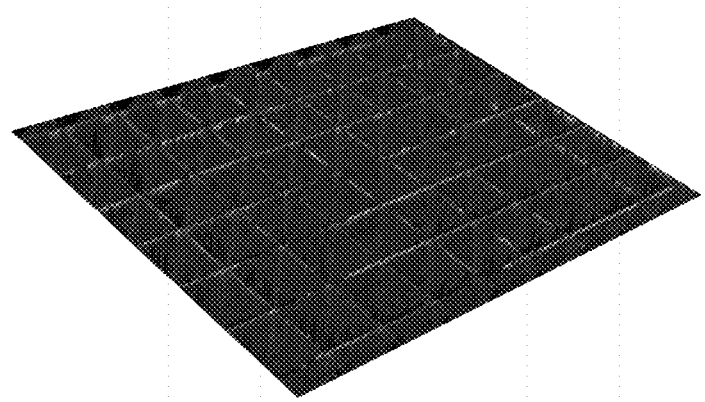
FIG. 16 is a picture of a surface shape of an optical sheet of Example 4

The surface shape of the optical sheet thus fabricated according to Example 4 is shown in FIG. 16. Further, values of the "Ra", the "ratio of the area with inclination angles of 30° or more", and the "FWHM" of the optical sheet of Example 4 are shown in FIG. 18. As shown in FIG. 18, in Example 4, the "Ra" is 2.435 μm, the "ratio of the area with inclination angles of 30° or more" is 90%, and the "FWHM" is 11.6638 mm.

Example 5

An optical sheet of Example 5 was fabricated by the following method. First, a first uniaxial extruder was used to form a molten resin containing 5% by mass of a diffusing agent with respect to 100% by mass of the base resin, and a second uniaxial extruder was used to form a molten resin containing no diffusing agent. Next, both molten resins were supplied to a single T-die and layered within the T-die. To a layered molten resin extruded from the T-die, a roll having pyramid shapes on its surface was used as one of two metal rolls and pressed onto the resin film at a linear pressure of 10 kg/cm to transfer its surface shape to a side of the molten resin containing no diffusing agent. In this way, a two-layer optical sheet with a total thickness of 1 mm, having inverted pyramid shapes on its surface, was fabricated. The upper layer having the inverted pyramid shapes was 0.1 mm in thickness, whereas the lower layer with a flat surface was 0.9 mm in thickness.

The surface shape of the optical sheet thus fabricated according to Example 5 is shown in FIG. 17. Further, values of the "Ra", the "ratio of the area with inclination angles of 30° or more", and the "FWHM" of the optical sheet of Example 5 are shown in FIG. 18. As shown in FIG. 18, in Example 5, the "Ra" is 0.553 μm, the "ratio of the area with inclination angles of 30° or more" is 32%, and the "FWHM" is 11.6034 mm.

Figure 19:
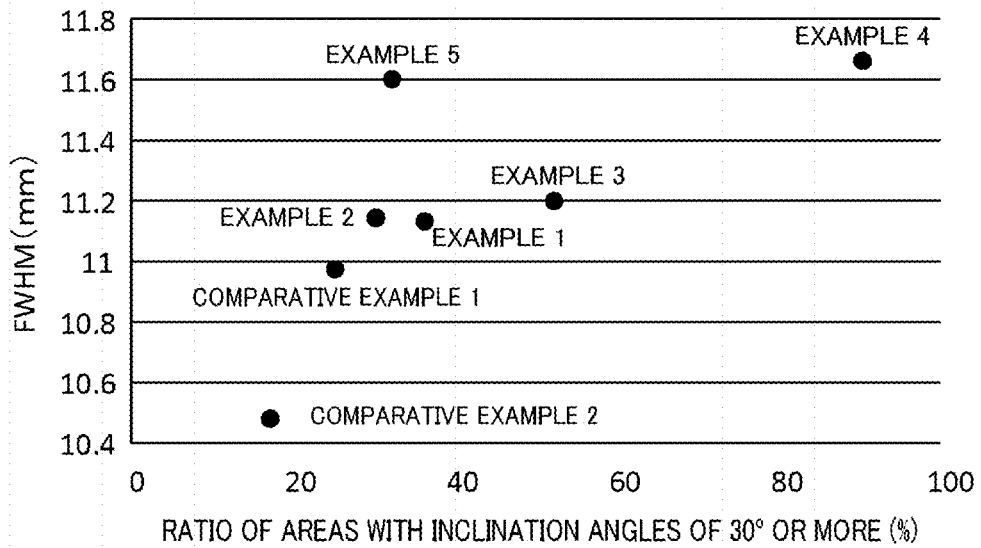
FIG. 19 illustrates a correlation between the "ratio of the area with inclination angles of 30° or more" and the "FWHM" of optical sheets of Examples 1 to 5 and those of Comparative Examples 1 and 2.

FIG. 19 illustrates a correlation between the "ratio of the area with inclination angles of 30° or more" and the "FWHM" of optical sheets of Examples 1 to 5 and those of Comparative Examples 1 and 2.

As shown in FIG. 19, the value of FWHM that indicates the luminance uniformity shows a tendency of rapidly decreasing when the "ratio of the area with inclination angles of 30° or more" drops below 30%. The results of Examples 1 to 4 show that, in cases of a single layer optical sheet, the FWHM tends to increase with an increase in the "ratio of the area with inclination angles of 30° or more". Further, from the result of Example 5, it should be understood that the layer with unevenness on its surface preferably contains no diffusing agent for the purpose of improving the reflection characteristics.

Figure 20:
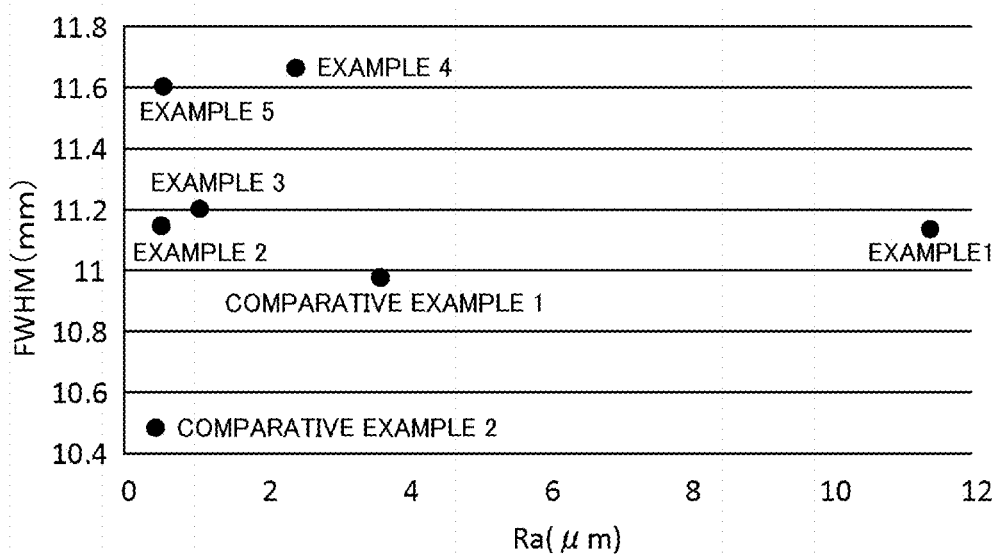
FIG. 20 illustrates a relation between the "roughness (Ra)" and the "FWHM" of optical sheets of Examples 1 to 5 and those of Comparative Examples 1 and 2.

FIG. 20 illustrates a relation between the "roughness (Ra)" and the "FWHM" of optical sheets of Examples 1 to 5 and those of Comparative Examples 1 and 2.

As should be understood from FIG. 20, no correlation was found between the "roughness" and the "FWHM". This is because, the "ratio of the area with inclination angles of 30° or more" as well as the reflection characteristics are basically the same if the shapes of the unevenness are similar, whereas the value of the roughness (surface roughness) varies depending on the sizes of the shapes of the unevenness, even if the shapes of the unevenness are similar. Thus, the "ratio of the area with inclination angles of 30° or more" can be considered as a suitable index, in evaluation of the reflection characteristics and the luminance uniformity of an optical sheet.

Other Embodiments

Figure 21:
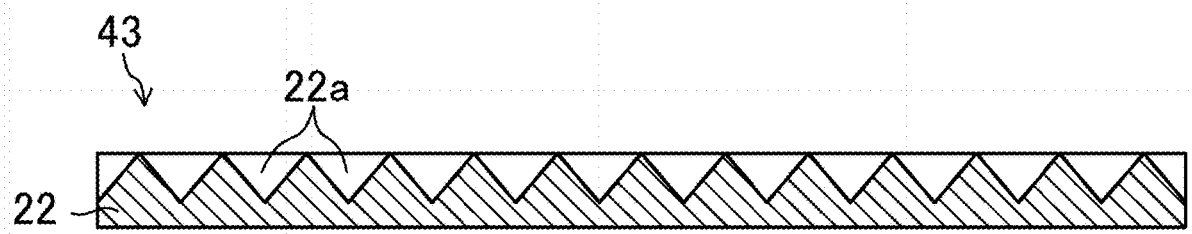
FIG. 21 is a cross-sectional view of an optical sheet of another embodiment.

Although the optical sheet 43 shown in FIG. 3 has a diffusion layer 21 and an uneven layer 22 formed on the diffusion layer 21, it is possible to structure the optical sheet 43 with only one uneven layer 22 as shown in FIG. 21. In this case, the surface of the optical sheet 43 having no recesses 22*a* may be a mirror surface or a matte surface. It should be noted that, in FIG. 21, the same reference characters are given to structuring elements that are identical to those of the optical sheet 43 shown in FIG. 3.

The diffusing agent contained in the optical sheet 43 (uneven layer 22) shown in FIG. 21 may be 0 part by weight or more and 4 parts by weight or less, more preferably 0 part by weight or more and 2 parts by weight or less, and further preferably 0 part by weight or more and 1 part by weight or less, with respect to 100 parts by weight of a matrix resin.

The matrix resin is preferably an aromatic polycarbonate resin. For example, the matrix resin may be obtained through a reaction of a dihydric phenol and a carbonate precursor by an interfacial polymerization method or a fusion method.

Examples of typical dihydric phenol include: 2,2-bis(4-hydroxyphenyl)propane (commonly known as bisphenol A), 1,1-bis(4-hydroxyphenyl)ethane, 1,1-bis(4-hydroxyphenyl)cyclohexane, 2,2-bis(3-methyl-4-hydroxyphenyl)propane, 2,2-bis(3,5-dimethyl-4-hydroxyphenyl)propane, bis(4-hydroxyphenyl)sulfide, bis(4-hydroxyphenyl)sulfone, and the like. Of these, bisphenol A is preferable. These dihydric phenols may be used alone or as a mixture of two or more kinds.

Examples of carbonate precursors include a carbonyl halide, a carbonate ester, a haloformate, and the like. Specific examples of the carbonate precursor include phosgene, diphenyl carbonate, and dihaloformate of a dihydric phenol, and the like.

A molecular weight modifier, a catalyst, and the like may be used as needed, at a time of producing the polycarbonate resin through a reaction of the dihydric phenol and the carbonate precursor by an interfacial polymerization method or a fusion method. To the polycarbonate resin, an additive may be blended as needed. Examples of the additive include a parting agent such as an ester or partial ester of a polyhydric alcohol and a fatty acid, a heat stabilizer such as a phosphite ester, phosphoric acid ester, or phosphonic acid ester, an ultraviolet absorber such as a benzotriazole-based ultraviolet absorber, an acetophenone ultraviolet absorber, or a salicylic acid ester, an antistatic agent, a coloring agent, a whitener, or a flame retardant. The polycarbonate resin may be a branched polycarbonate resin obtained by copolymerizing a polyfunctional aromatic compound having three or more functional groups. The polycarbonate resin may be a polyester carbonate resin obtained by copolymerizing an aromatic or aliphatic bifunctional carboxylic acid. The polycarbonate resin may be a mixture of two or more kinds of polycarbonate resins obtained.

The molecular weight of the polycarbonate resin is preferably 10,000 to 100,000, more preferably 15,000 to 35,000, in the viscosity-average molecular weight (M). The polycarbonate resin having such a viscosity-average molecular weight is preferable, as it is sufficiently strong and exhibits a good melt flowability during molding. The "viscosity-average molecular weight" herein is obtained by applying a specific viscosity (ηsp) derived from a solution obtained in which 0.7 g of polycarbonate resin is dissolved in 100 ml of methylene chloride at 20° C.

$$\eta sp/C=[\eta]+0.45\times[\eta]^2 C,$$

where [η] is a limiting viscosity and is $1.23\times10^{-4}M^{0.83}C=0.7$.

The diffusing agent is preferably a silicone-based diffusing agent. For example, the diffusing agent may be spherical microparticles having a siloxane bond, whose mean particle size is 0.8 μm or more and 12 μm or less. With the mean particle size of the diffusing agent falling short of 0.8 μm, it tends to be difficult to achieve sufficient light diffusibility even if the amount of diffusing agent added is varied. On the other hand, it tends to be difficult to achieve a favorable light diffusibility with the mean particle size exceeding 12 μm, even if the amount of diffusing agent added is varied. Examples of typically adoptable silicone-based diffusing microparticles include silica, silicone resin, silicone rubber, silicone complex powder which is spherical powder obtained by coating the surfaces of spherical silicone rubber powder with silicone resin, and a combination of these. Of these, silicone complex powder is particularly preferable.

Other Examples

Optical sheets of Examples 6 to 20 were fabricated by the following method. First, to 100 parts by weight of an aromatic polycarbonate resin, a silicone complex powder (mean particle size: 2.0 μm) as the diffusing agent was added so that the composition was as shown in FIG. 22, then the mixture was molten and fused in an extruder and extruded from a T-die. Then, as one of two metal rolls, a roll having on its surface square pyramid shapes of 50 μm in height and 90° in vertex angle at a pitch of 100 μm was used. As the other roll, a roll having a random matte surface (surface roughness Ra=4 μm) was used for Example 6 to 18, and a roll with a mirror surface (surface roughness Ra=0.01 μm) was used for Examples 19 and 20. Sandwiching the molten resin extruded from the T-die between these two rolls, shapes on the rolls were transferred while the molten resin was cooled. In this way, single layer optical sheets with the thicknesses as shown in FIG. 22 were fabricated. Each of the optical sheets has (inverted) pyramid shapes of 45 μm in depth on one surface, and has, on the other side, a matte surface or a mirror surface with the surface roughness shown in FIG. 22.

FIG. 22 illustrates, for each of the optical sheets of Examples 6 to 20, the "surface shapes (including ratio of the area with inclination angles of 30° or more) and surface roughness", the "FWHM", the "FW0.1M", and the "average values of transmittance and reflectance for spectral beams of 400 nm to 700 nm in wavelength". The values of the "FWHM", the "FW0.1 M", and the "average values of transmittance and reflectance for spectral beams of 400 nm to 700 nm in wavelength" were measured with the matte surface or mirror surface of the optical sheet as the light incident side, and the surface with the inverted pyramids as the light emitting side.

As shown in FIG. 22, with the optical sheets of Examples 6 to 20, the "FWHM" and the "FW0.1 M" increases thus improving the diffusibility, with a decrease in the content of the diffusing agent. Specifically, the content of the diffusing agent is preferably 0 part by weight or more and 4 parts by weight or less, more preferably 0 part by weight or more and 2 parts by weight or less, and further preferably 0 part by weight or more and 1 part by weight or less, with respect to 100 parts by weight of a matrix resin.

The optical sheet of Example 21 includes three optical sheets fabricated in Example 6 overlapped with one another. The optical sheet of Example 22 includes three optical sheets fabricated in Example 7 overlapped with one another. The optical sheet of Example 23 includes three optical sheets fabricated in Example 8 overlapped with one another. The optical sheet of Example 24 includes three optical sheets fabricated in Example 9 overlapped with one another. The optical sheet of Example 25 includes three optical sheets fabricated in Example 11 overlapped with one another. The optical sheet of Example 26 includes three optical sheets fabricated in Example 12 overlapped with one another. The optical sheet of Example 27 includes three optical sheets fabricated in Example 13 overlapped with one another. The optical sheet of Example 28 includes three optical sheets fabricated in Example 14 overlapped with one another. The optical sheet of Example 29 includes four films overlapped with one another. Each of the films has the same composition as the optical sheet fabricated in Example 6 and has a thickness of 115 μm. The optical sheet of Example 30 includes four films overlapped with one another. Each of the films has the same composition as the optical sheet fabricated in Example 9 and has a thickness of 115 μm. The optical sheet of Example 31 includes four films overlapped with one another. Each of the films has the same composition as the optical sheet fabricated in Example 11 and has a thickness of 115 μm. The optical sheet of Example 32 includes four films overlapped with one another. Each of the films has the same composition as the optical sheet fabricated in Example 13 and has a thickness of 115 μm.

Figure 23:
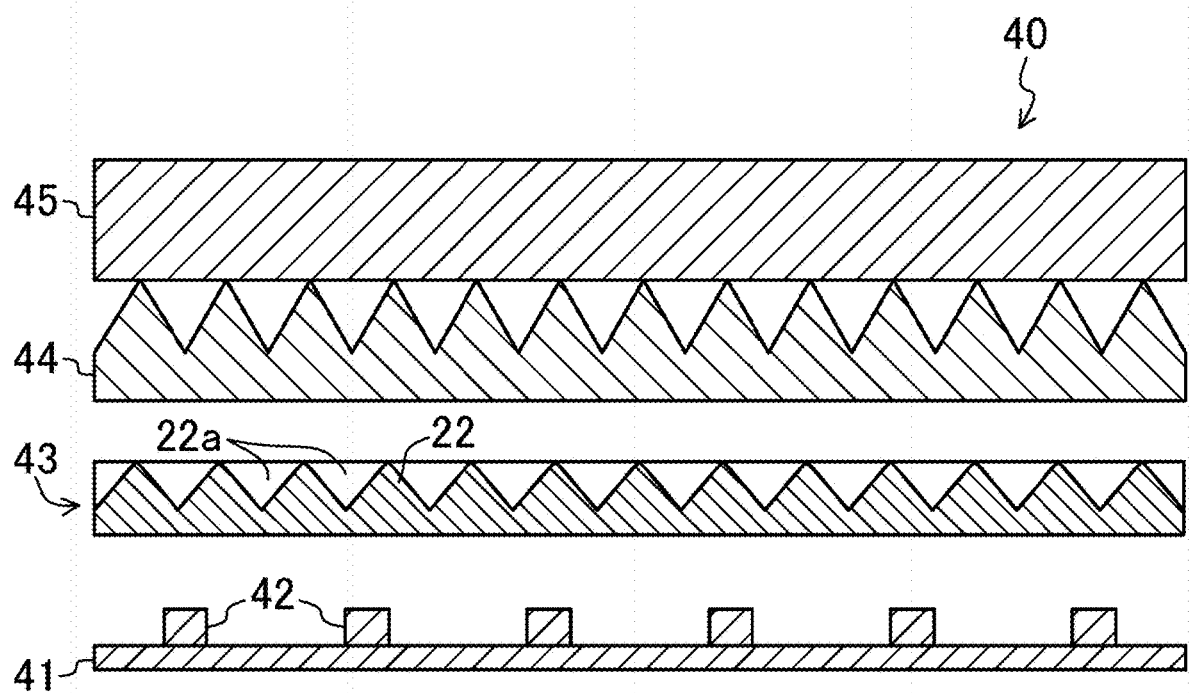
FIG. 23 illustrates a cross-sectional structure of the backlight unit at a time of evaluating the luminance uniformity for the optical sheets of Examples 21 to 32.
Figure 24:
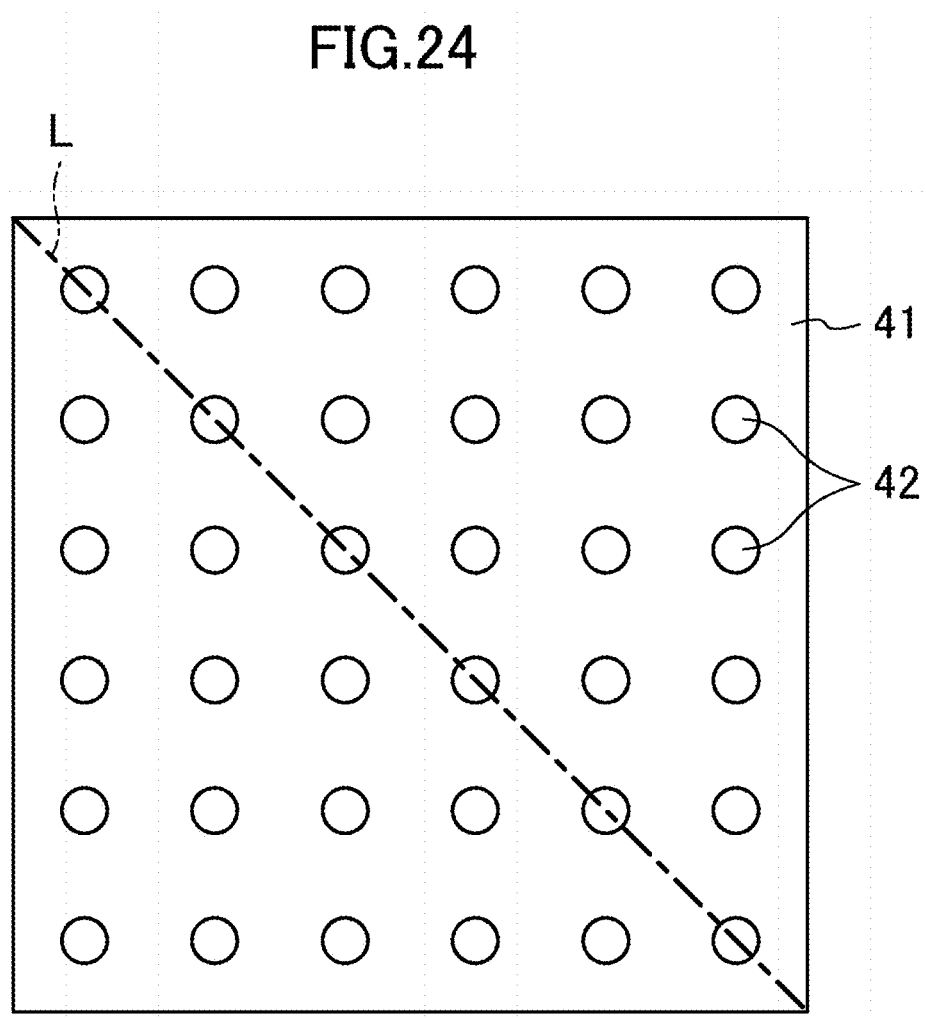
FIG. 24 illustrates an arrangement of light sources in the backlight unit shown in FIG. 23.

FIG. 23 illustrates a cross-sectional structure of the backlight unit at a time of evaluating the luminance uniformity for the optical sheets of Examples 21 to 32. FIG. 24 shows an arrangement of light sources in the backlight unit 40 shown in FIG. 23. It should be noted that, in FIG. 23, the same reference characters are given to structuring elements that are identical to those of the backlight unit 40 shown in FIG. 2. For the sake of easier understanding, the optical sheet 43 of FIG. 23 has only one layer.

In the measurement of the "luminance uniformity", a predetermined number of optical sheets 43 each having inverted pyramid shapes are arranged above arrays of small light sources 42 (LED array), and two prism sheets 44 and 45 are arranged above the optical sheets 43, as shown in FIG. 23 and FIG. 24. The distance from the LED array to the upper most surface of the prism sheet was unified to 2 mm. As the LED array, an array with LEDs arranged at a pitch of 7 mm was used. LEDs (small light sources 42) used were blue LEDs of product number XPGDRY-L1-0000-00501 manufactured by Cree.

The "luminance uniformity" was evaluated as follows. First, using an LED array (six times six) as shown in FIG. 24, cross-sectional luminances were obtained along a diagonal line passing through immediately above the LEDs (small light sources 42). Then, the average and the standard deviation of the cross-sectional luminances were calculated. The "luminance uniformity" was derived by a formula of the "luminance uniformity (%)"=(average value−standard deviation)/(average value+standard deviation)×100. The higher the value of the "luminance uniformity" derived is, the more uniform the luminance is.

FIG. 25 illustrates, for each of the optical sheets of Examples 21 to 32, the "luminance uniformity", the "average transmittance and reflectance for spectral beams of 400 nm to 700 nm in wavelength", and the "ratio of the area with inclination angles of 30° or more". The values of the "luminance uniformity" and the "average transmittance and reflectance for spectral beams of 400 nm to 700 nm in wavelength" were measured with the matte surface of the optical sheet as the light incident side, and the surface with the inverted pyramids as the light emitting side. The values of the "ratio of the area with inclination angles of 30° or more" were calculated as follows. Namely, the "ratio of the area with inclination angles of 30° or more" was measured for each of the three overlapped films in the optical sheets of Examples 21 to 28, and for each of four overlapped sheets in the optical sheets of Examples 29 to 32. Then, the "ratio of the area with inclination angles of 30° or more" was derived as the average value of the measured values.

From the optical sheets of Examples 21 to 32 as shown in FIG. 25, it should be understood that luminance uniformity increases with a decrease in the content of diffusing agent, when a plurality of films each having the same structure (thickness, composition, and the like) are used and overlapped with one another.

In view of the foregoing description, the embodiments (including the Examples. The same applies for the following description.) of the present disclosure are described. However, the present disclosure is not limited to the above-described embodiments alone, and various modifications may be made within the scope of the present disclosure. That is, the description of the foregoing embodiments is merely exemplary in nature, and is not intended to limit the application or the use of the present disclosure.

Figure 26:
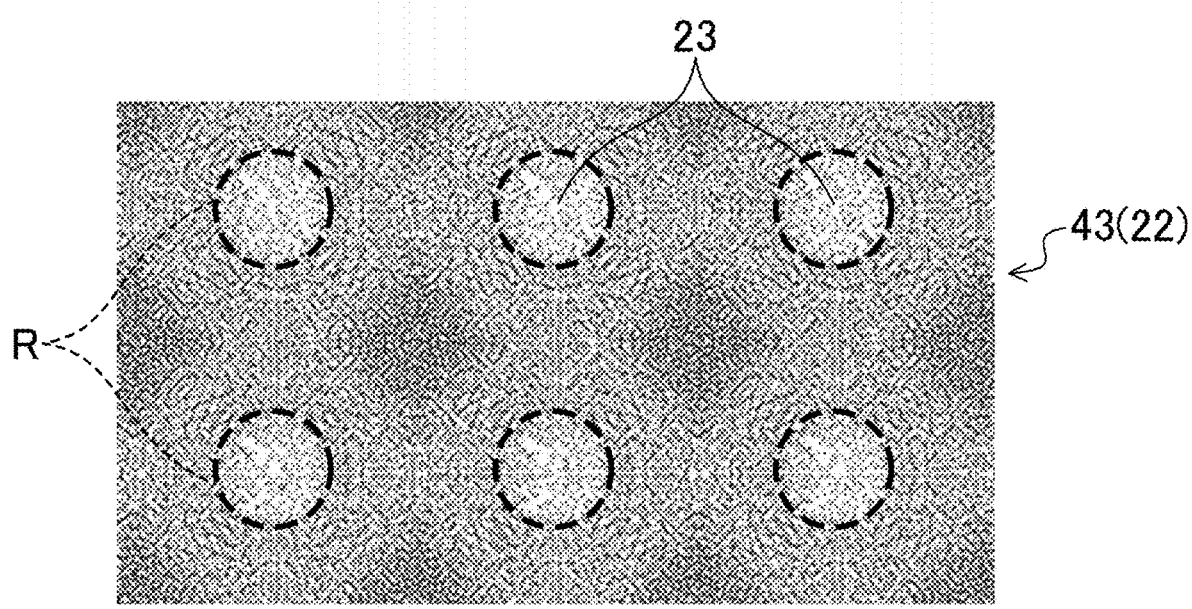
FIG. 26 is a plan view of an optical sheet of a modification.

For example, as shown in a modification of FIG. 26, printed portions 23, e.g., dots of white ink, that block and/or reflect light from the small light sources 42 may be formed on a portion of one surface (the upper surface of the uneven layer 22) closer to the display screen 50a, of the optical sheet 43. The above portion of the optical sheet 43 is opposite to another portion (the portion of the lower surface of the diffusion layer 21 shown by R in the figure) of another surface closer to the small light sources 42, of the optical sheet 43. The other portion faces the small light sources 42. In FIG. 26, the areas where the printed portions 23 are arranged are shown in white, and illustration of recesses 22a are omitted.

The printed portions 23 of the present modification further improve the luminance uniformity, as they bring about reflection effect of light from the small light sources 42 and/or an effect of blocking excessive light from the small light sources 42 in a direction towards directly above.

In the present modification, the printed portions 23 may be formed on at least one of the surfaces of the optical sheet 43. Further, in cases of forming the printed portions 23 on one surface of an optical sheet 43 having unevenness on one of its surfaces only, the printed portions 23 may be formed on the surface having the unevenness or on the surface of the other side.

The invention claimed is:

1. An optical sheet to be interposed between a plurality of small light sources and a prism sheet in a liquid crystal display device having the small light sources arranged in a dispersed manner at a side of the liquid crystal display device opposite to a display screen, wherein:
   the optical sheet includes a plurality of optical sheets overlapped relative to one another,
   each of the plurality of optical sheets comprises 0 part by weight or more and 2 parts by weight or less of a diffusing agent with respect to 100 parts by weight of a matrix resin constituting each of the plurality of optical sheets,
   each of the plurality of optical sheets has one surface having recesses, each recess having an inverted pyramid shape and being two-dimensionally arrayed,
   30% or more regions of a plurality of minute regions are inclined at inclination angles of 30° or more from a flat surface,
   the plurality of minute regions are two-dimensionally arrayed at equal intervals on the one surface,
   each of the plurality of minute regions has an area of 100 $\mu m^2$ or less; and
   a distance between the plurality of small light sources and the optical sheet is 2 mm or less.

2. The optical sheet of claim 1, wherein:
   printed portions that block and/or reflect light from the small light sources are formed on a first portion of one surface of the optical sheet closer to the small light sources and/or on a second portion of another surface of the optical sheet closer to the display screen, and
   the first portion faces the small light sources and the second portion is opposite to the first portion.

3. The optical sheet of claim 1, wherein:
   the matrix resin is an aromatic polycarbonate resin, and the diffusing agent is a silicone-based diffusing agent.

4. The optical sheet of claim 1, wherein each of the optical sheets comprises 0 part by weight or more and 1 parts by weight or less of the diffusing agent with respect to 100 parts by weight of the matrix resin.

5. The optical sheet of claim 1, wherein each of the optical sheets does not contain the diffusing agent, substantially.

6. A method for evaluating the optical sheet of claim 1, the method comprising:
   when at least one scope of 0.5 mm square or more of the surface of the optical sheet having the unevenness is measured, determining height data of each of a plurality of pixels of an image obtained,
   calculating an approximated surface, from the height data of each pixel, for a minute region of 100 $\mu m^2$ or less including a plurality of pixels,
   repeatedly performing a calculation to obtain an inclination angle between: (i) a flat surface (with a height of 0) appearing after the unevenness is imaginarily removed and: (ii) the approximated surface, while two-dimensionally shifting the minute region at equal intervals along the flat surface by using at least one of the pixels as a unit to obtain a plurality of minute regions, and
   calculating a ratio of a total area of some of the minute regions each having the inclination angle of 30° or more with respect to a total area of all the minute regions, for which the calculation is made repeatedly.

7. A backlight unit to be built into a liquid crystal display device and configured to guide light emitted from a plurality of small light sources towards a display screen, the unit comprising:
   an optical sheet positioned between the display screen and the plurality of small light sources, wherein:
   the optical sheet includes a plurality of optical sheets overlapped relative to one another,
   each of the plurality of optical sheets comprises 0 part by weight or more and 2 parts by weight or less of a diffusing agent with respect to 100 parts by weight of a matrix resin constituting each of the plurality of optical sheets,
   each of the plurality of optical sheets has one surface having recesses, each recess having an inverted pyramid shape and being two-dimensionally arrayed, 30% or more regions of a plurality of minute regions are inclined at inclination angles of 30° or more from a flat surface, the plurality of minute regions are two-dimensionally arrayed at equal intervals on the one surface, each of the plurality of minute regions has an area of 100 μm² or less; and a distance between the plurality of small light sources and the optical sheet is 2 mm or less.

8. The backlight unit of claim 7, wherein the plurality of small light sources are each an LED element.

9. The backlight unit of claim 7, wherein the plurality of small light sources are regularly arranged.

10. The backlight unit of claim 7, wherein the plurality of small light sources are arranged on a reflection sheet that is opposite to the optical sheet across the small light sources.

11. A liquid crystal display device comprising:
the backlight unit of claim 7, and
a liquid crystal display panel.

12. An information device, comprising the liquid crystal display device of claim 11.

13. The backlight unit of claim 7, wherein the backlight unit is a local-dimming back light unit.

14. The backlight unit of claim 7, wherein, among the plurality of optical sheets, an average value of a ratio of the regions, which are inclined at the inclination angles of 30° or more, to the plurality of minute regions is 80% or more.

15. The backlight unit of claim 7, wherein the distance between the plurality of small light sources and the optical sheet is 1 mm or less.

* * * * *